United States Patent
Watanabe et al.

(10) Patent No.: US 12,443,372 B2
(45) Date of Patent: Oct. 14, 2025

(54) MEMORY SYSTEM AND METHOD OF CONTROLLING MEMORY CHIPS

(71) Applicant: Kioxia Corporation, Tokyo (JP)

(72) Inventors: Konosuke Watanabe, Kawasaki (JP); Shinji Yonezawa, Machida (JP); Eiji Sukigara, Kawaguchi (JP); Mitsusato Hara, Sagamihara (JP); Haruka Mori, Kawasaki (JP); Hajime Yamazaki, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/594,070

(22) Filed: Mar. 4, 2024

(65) Prior Publication Data
US 2024/0302997 A1 Sep. 12, 2024

(30) Foreign Application Priority Data
Mar. 6, 2023 (JP) .................. 2023-033708

(51) Int. Cl.
*G06F 3/06* (2006.01)

(52) U.S. Cl.
CPC .......... *G06F 3/0659* (2013.01); *G06F 3/0604* (2013.01); *G06F 3/0688* (2013.01)

(58) Field of Classification Search
CPC ..... G06F 3/0659; G06F 3/0604; G06F 3/0688
See application file for complete search history.

(56) References Cited

U.S. PATENT DOCUMENTS

| | | | | |
|---|---|---|---|---|
| 10,019,161 | B2* | 7/2018 | Sharifie | G06F 3/0629 |
| 10,642,500 | B2 | 5/2020 | Benisty | |
| 2016/0162186 | A1* | 6/2016 | Kashyap | G06F 3/0688 711/103 |
| 2019/0235790 | A1* | 8/2019 | Koo | G06F 21/78 |
| 2019/0317696 | A1* | 10/2019 | Jagadish | G06F 3/0679 |
| 2020/0301613 | A1* | 9/2020 | Yamazaki | G06F 3/0679 |
| 2022/0083274 | A1* | 3/2022 | Cho | G06F 3/064 |
| 2022/0121581 | A1* | 4/2022 | Cho | G06F 13/1626 |
| 2022/0197563 | A1 | 6/2022 | Lam et al. | |
| 2022/0206871 | A1 | 6/2022 | Armangau et al. | |
| 2023/0221888 | A1* | 7/2023 | Sharma | G06F 3/0679 711/164 |
| 2023/0280941 | A1* | 9/2023 | Agrawal | G06F 3/0659 711/154 |
| 2024/0201904 | A1* | 6/2024 | Kanno | G06F 3/0659 |
| 2024/0248644 | A1* | 7/2024 | Watanabe | G06F 3/0656 |

* cited by examiner

*Primary Examiner* — Ryan Bertram
(74) *Attorney, Agent, or Firm* — Oblon, McClelland, Maier &Neustadt, L.L.P.

(57) ABSTRACT

According to one embodiment, a memory system includes a plurality of nonvolatile memory chips and a controller. The controller manages whether each of the nonvolatile memory chips is in a busy state or not. When one or more requests issued by a host are stored in at least one queue of the host, the controller identifies, from the one or more requests, a first request for a first nonvolatile memory chip that is not in the busy state. The controller executes a process in accordance with the identified first request.

19 Claims, 23 Drawing Sheets

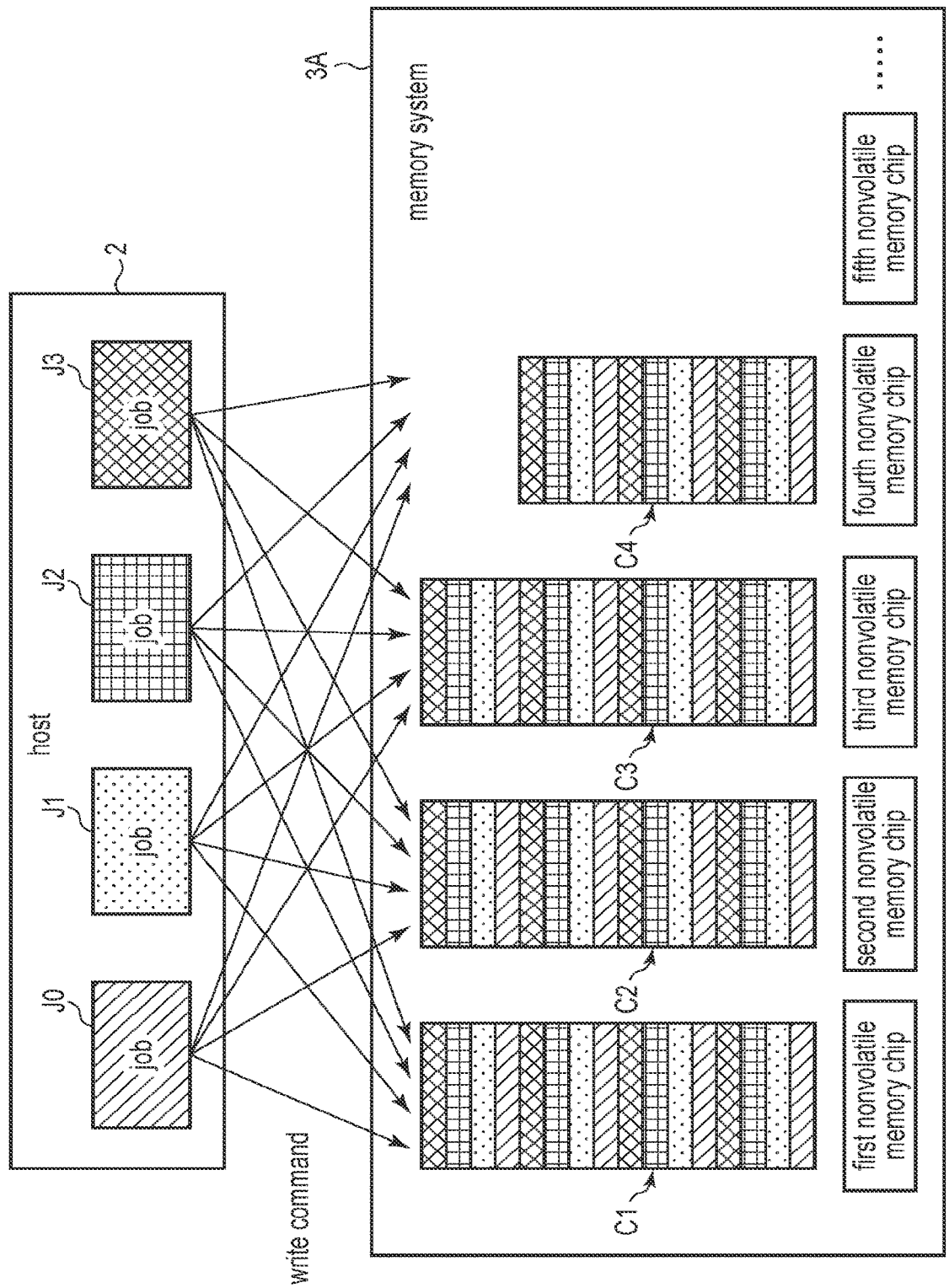
F I G. 2

| chip ID | state |
|---------|-------|
| 1 | busy |
| 2 | idle |
| 3 | idle |
| ⋮ | ⋮ |
| N | busy |
F I G. 3
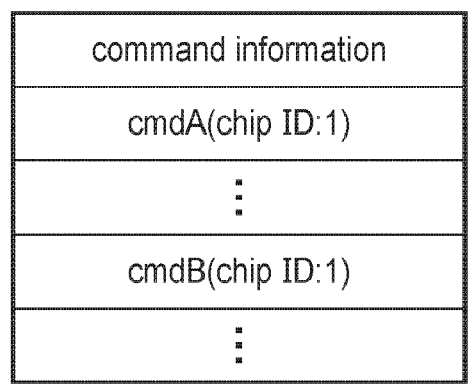
F I G. 4
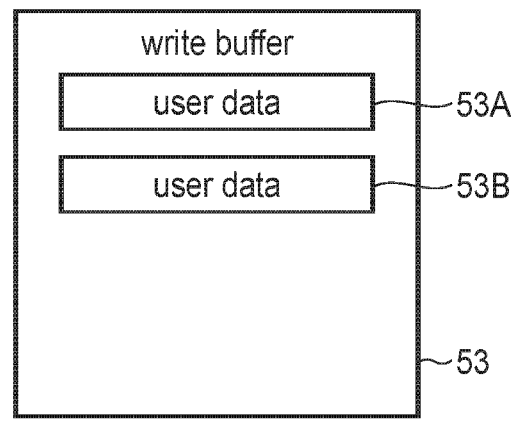
F I G. 5

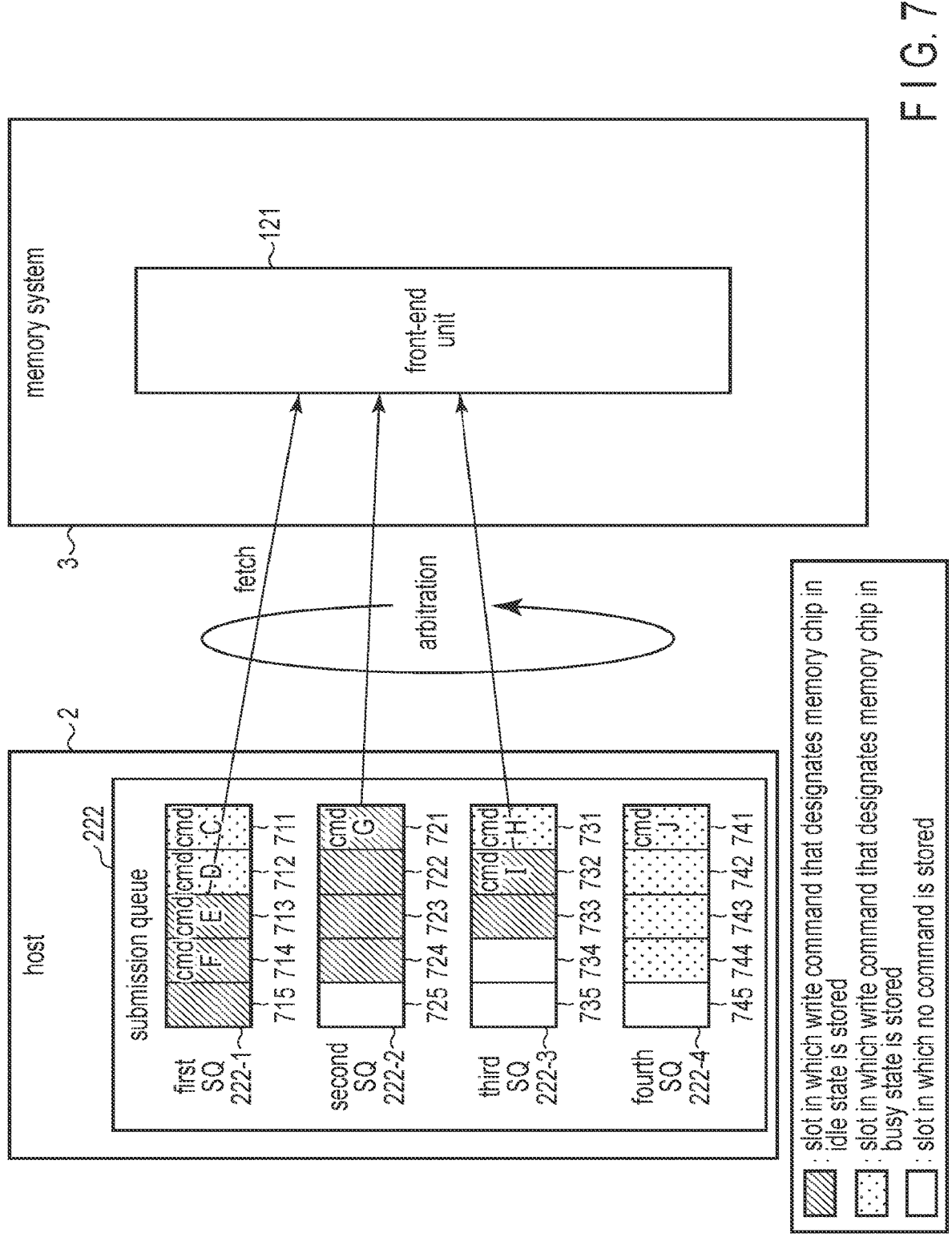
F I G. 7

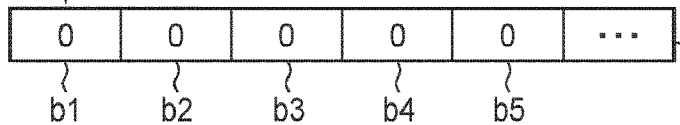
(a)
when third write command has been fetched
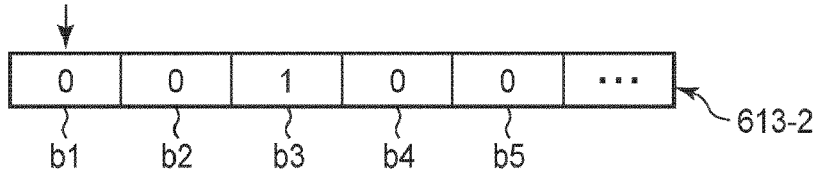
(b)
when first write command has been fetched
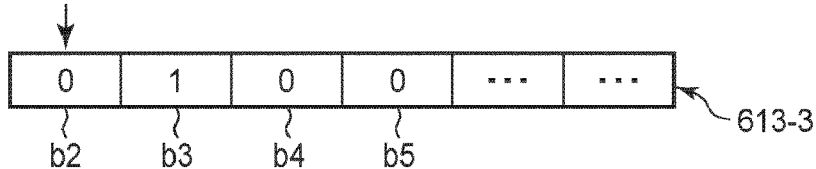
(c)
0: yet-to-be-fetched
1: fetched
FIG. 8

| command information |
|---|
| cmdA(chip ID:1) |
| ⋮ |
| cmdB(chip ID:1) |
| ⋮ |
| cmdE(chip ID:2) |
| cmdG(chip ID:3) |
| cmdI(chip ID:2) |
| cmdF(chip ID:3) |

F I G. 13

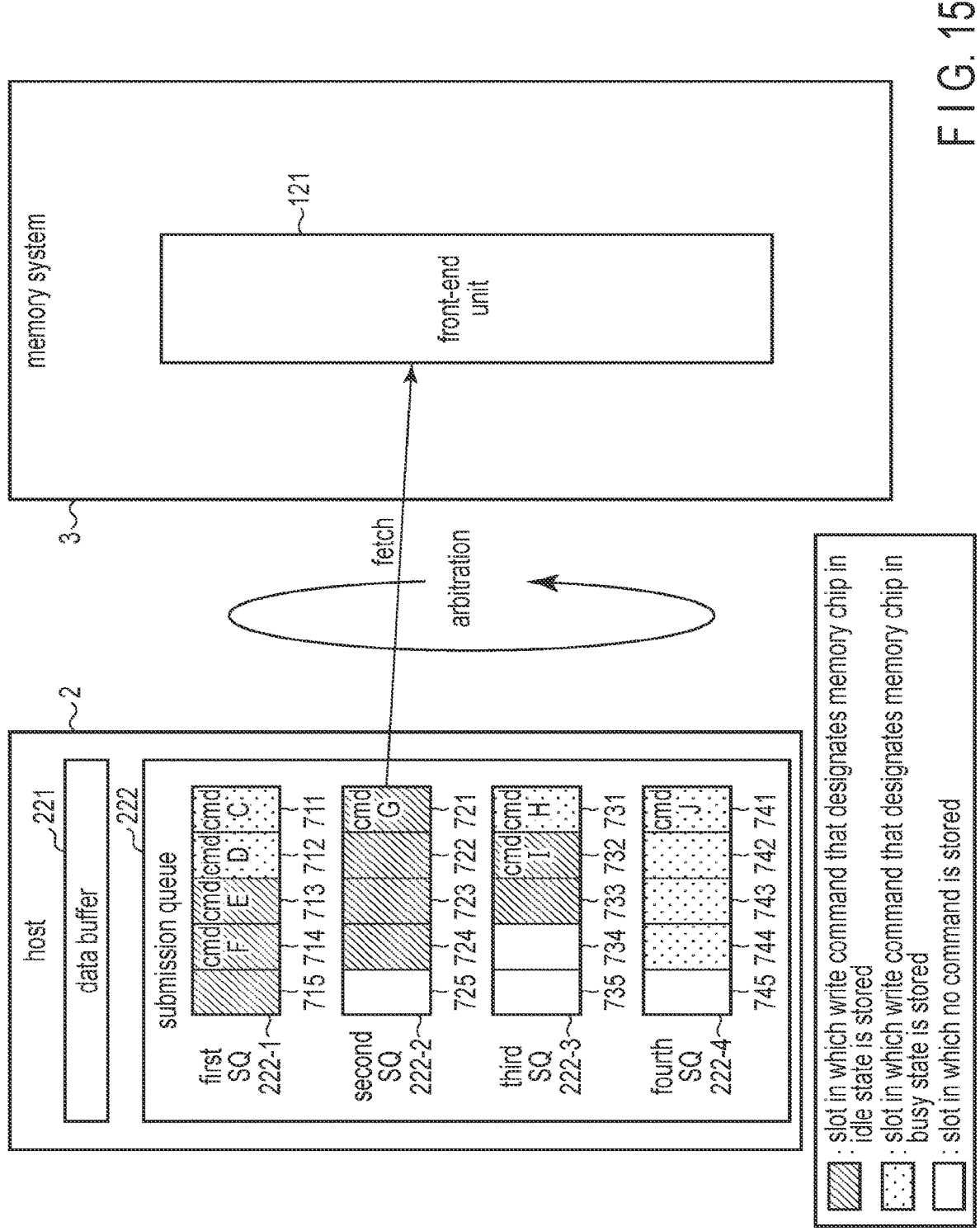
F I G. 15

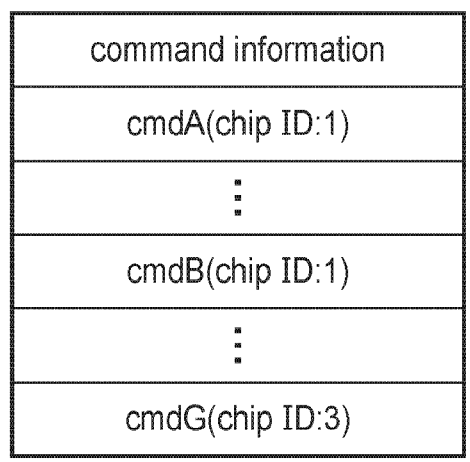
F I G. 18

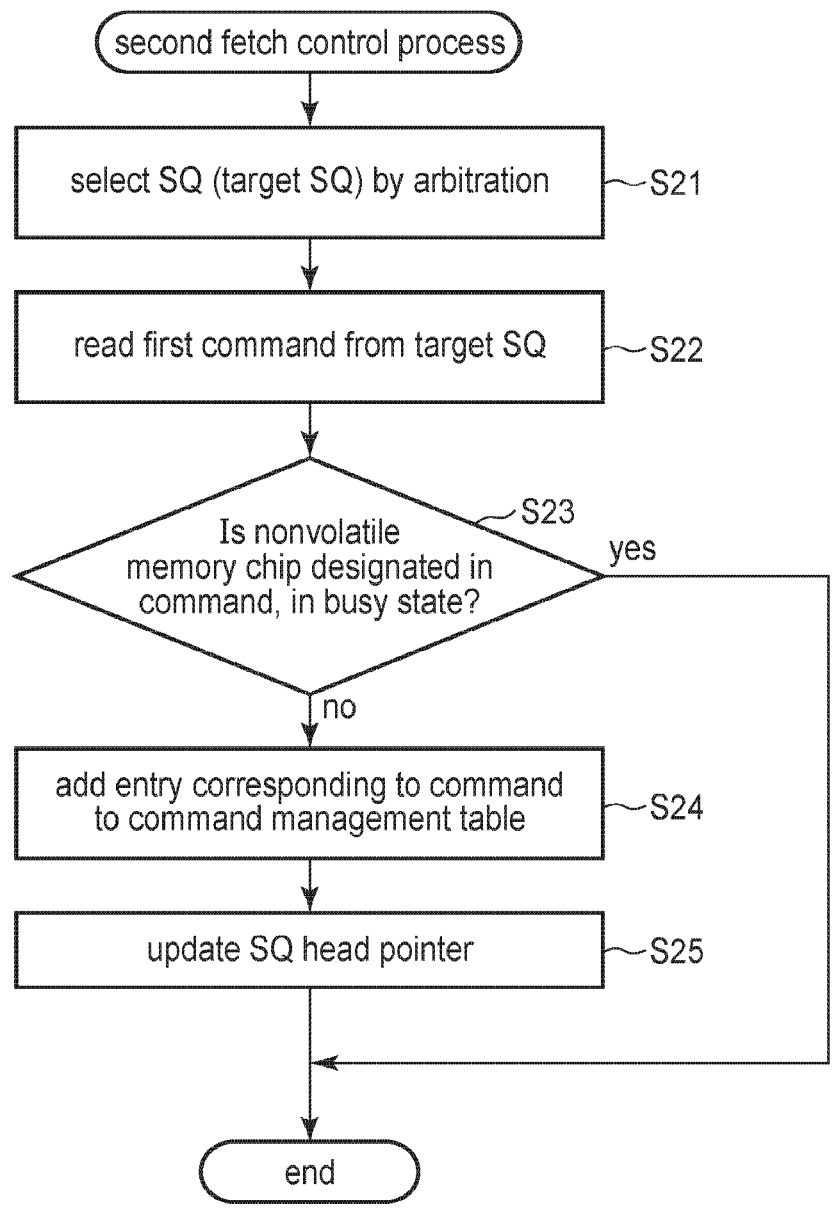
F I G. 19

| command information |
|---|
| cmdA(chip ID:1) |
| ⋮ |
| cmdB(chip ID:1) |
| ⋮ |
| cmdC(chip ID:1) |
| cmdG(chip ID:3) |
| cmdH(chip ID:N) |
| cmdJ(chip ID:1) |

F I G. 22

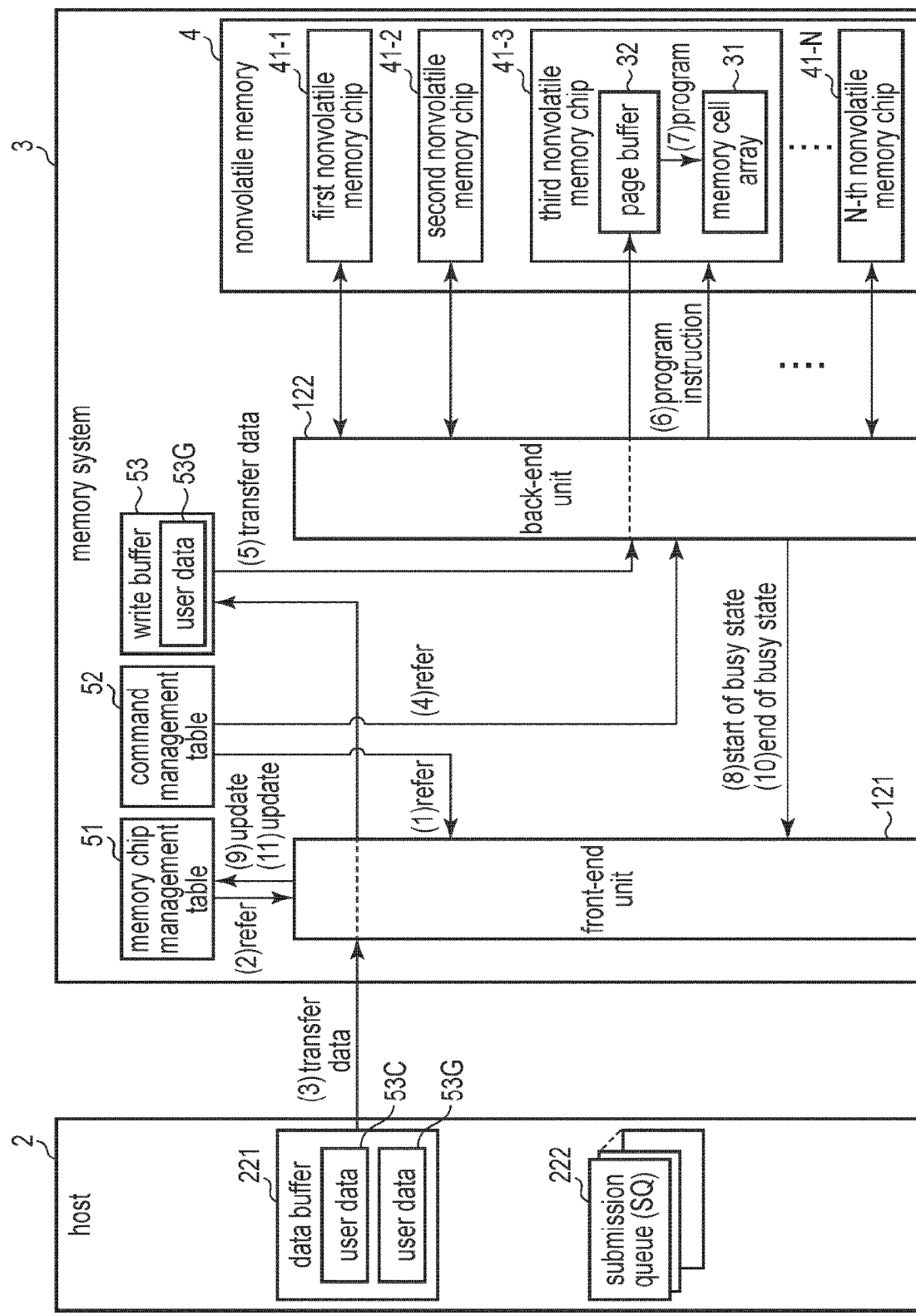
F I G. 23

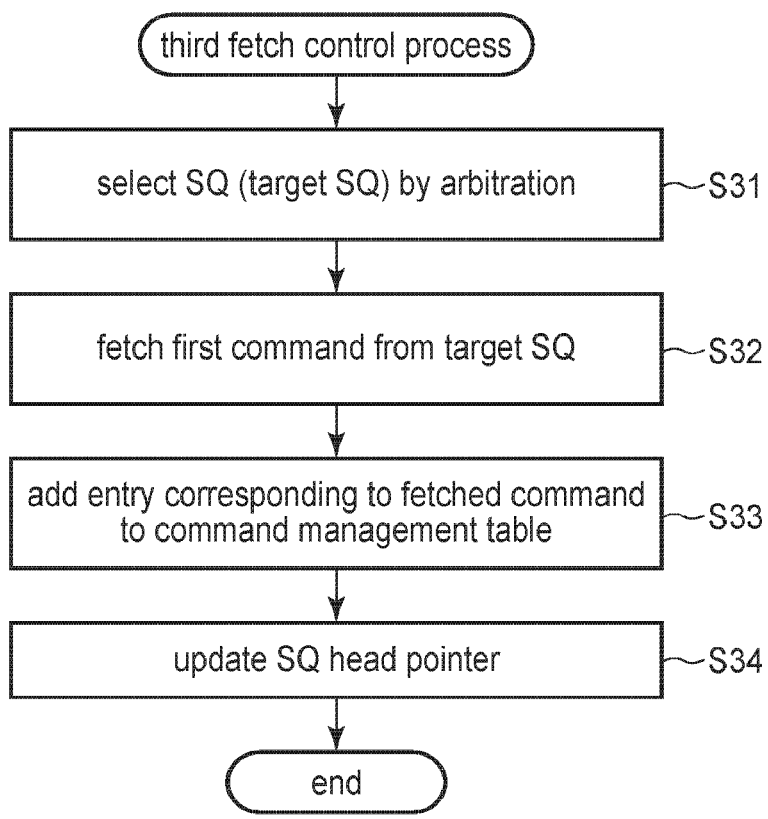
F I G. 24

MEMORY SYSTEM AND METHOD OF CONTROLLING MEMORY CHIPS

CROSS-REFERENCE TO RELATED APPLICATIONS

This application is based upon and claims the benefit of priority from Japanese Patent Application No. 2023-033708, filed Mar. 6, 2023, the entire contents of which are incorporated herein by reference.

FIELD

Embodiments described herein relate generally to a technique for controlling a nonvolatile memory.

BACKGROUND

In recent years, memory systems that include a nonvolatile memory are widely used. As one of such memory systems, a solid state drive (SSD) that includes a NAND flash memory is known. The SSD is used as a main storage for various computing devices.

The nonvolatile memory includes, for example, one or more nonvolatile memory chips (or, nonvolatile memory dies). The memory system performs a process for the nonvolatile memory chips in accordance with a request received from a host.

More specifically, the host includes, for example, a submission queue (SQ). The submission queue is capable of storing one or more requests to be executed in the memory system.

The memory system receives a request from the host by fetching the request from the submission queue. The memory system performs a process in accordance with the received request.

In some cases, the host may designate a nonvolatile memory chip that is a target of each request.

In this case, if the memory system fetches a large number of requests that designate a single nonvolatile memory chip, from the host, resources of the memory system are wasted (i.e., not efficiently used) because of requests for which corresponding processes cannot be immediately started. Then, in the memory system, efficiency (throughput) of processes may be reduced for lack of the resources.

BRIEF DESCRIPTION OF THE DRAWINGS

FIG. 2 is a diagram illustrating an example in which resources are insufficient because of write requests from a host, in a memory system according to a comparative example.

FIG. 3 is a diagram illustrating an example of a configuration of a memory chip management table used in the memory system according to the first embodiment.

FIG. 4 is a diagram illustrating an example of a configuration of a command management table used in the memory system according to the first embodiment.

FIG. 5 is a diagram illustrating an example of user data stored in a write buffer in the memory system according to the first embodiment.

FIG. 7 is a diagram illustrating an example of commands fetched from submission queues by a fetch control operation in the memory system according to the first embodiment.

FIG. 8 is a diagram illustrating an example of an SQ bitmap used in the memory system according to the first embodiment.

FIG. 13 is a diagram illustrating an example of the command management table to which write commands are added, in the memory system according to the first embodiment.

FIG. 15 is a diagram illustrating another example of commands fetched from the submission queues by the fetch control operation in the memory system according to the first embodiment.

FIG. 18 is a diagram illustrating another example of the command management table to which a write command is added, in the memory system according to the first embodiment.

FIG. 19 is a flowchart illustrating an example of the procedure of a second fetch control process executed in the memory system according to the first embodiment.

FIG. 22 is a diagram illustrating an example of a command management table to which write commands are added, in the memory system according to the second embodiment.

FIG. 23 is a diagram illustrating an example of a command execution operation and a busy state management operation in the memory system according to the second embodiment.

FIG. 24 is a flowchart illustrating an example of the procedure of a third fetch control process executed in the memory system according to the second embodiment.

DETAILED DESCRIPTION

Figure 1:
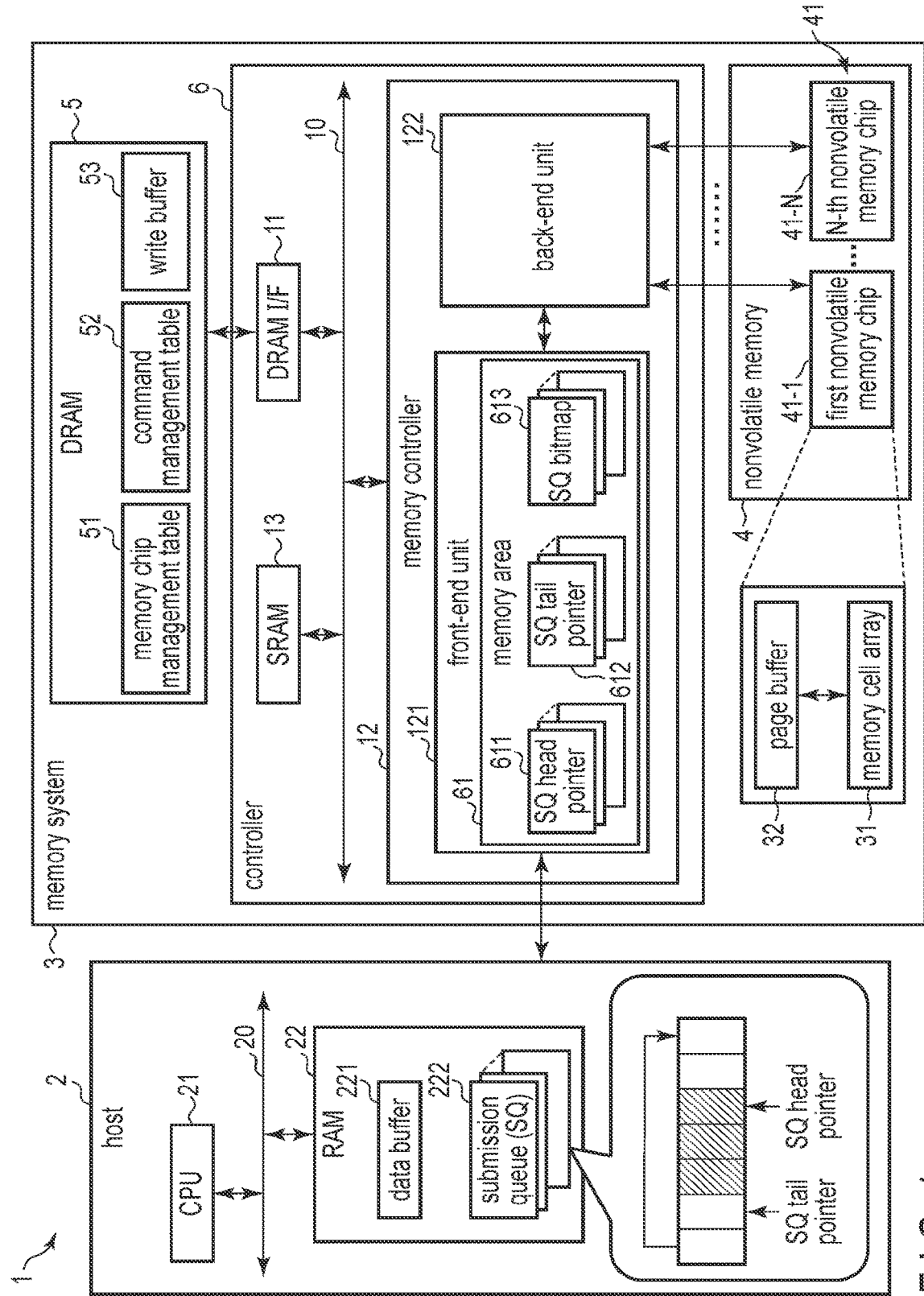
FIG. 1 is a block diagram illustrating an example of a configuration of an information processing system that includes a memory system according to a first embodiment.

In general, according to one embodiment, a memory system includes a plurality of nonvolatile memory chips and a controller. The plurality of nonvolatile memory chips includes at least a first nonvolatile memory chip. The controller manages whether each of the plurality of nonvolatile memory chips is in a busy state or not. When one or more requests issued by a host are stored in at least one queue of the host, the controller identifies, from the one or more requests, a first request for the first nonvolatile memory chip that is not in the busy state. The controller executes a process in accordance with the identified first request.

Various embodiments will be described hereinafter with reference to the accompanying drawings.

First Embodiment

First, this specification explains a configuration of an information processing system 1 that includes a memory system according to a first embodiment. The information processing system 1 includes a host device 2 and a memory system 3.

The host device 2 may be either a storage server that stores a large amount of various data to the memory system 3, or a personal computer. Hereinafter, the host device 2 is also referred to as a host 2.

The memory system 3 is a storage device configured to write data into a nonvolatile memory and read data from the nonvolatile memory. The nonvolatile memory is, for example, a NAND flash memory. The memory system 3 is also referred to as a storage device or a semiconductor storage device. The memory system 3 is implemented as, for example, a solid state drive (SSD) including a NAND flash memory.

The memory system 3 may be used as a storage of the host 2. The memory system 3 may be provided inside the host 2 or may be connected to the host 2 via a cable or a network.

An interface for connecting the host 2 to the memory system 3 conforms to standards such as PCI Express™ (PCIe™), Ethernet™, Fibre channel, or NVM Express™ (NVMe™).

The host 2 includes, for example, a CPU 21 and a random access memory (RAM) 22. The CPU 21 and the RAM 22 are connected via, for example, a bus 20.

The CPU 21 is, for example, at least one processor. The CPU 21 controls operations of various components of the host 2.

The RAM 22 is a volatile memory. The RAM 22 is, for example, a dynamic random access memory (DRAM) or a static random access memory (SRAM). The storage area of the RAM 22 is allocated as, for example, a data buffer 221 and one or more submission queues 222.

The data buffer 221 temporarily stores data to be transmitted to the memory system 3 along with a request for the memory system 3 issued by the host 2 (more specifically, the CPU 21). For example, when a write request is issued, data to be written into the nonvolatile memory of the memory system 3 in accordance with the write request is temporarily stored in the data buffer 221. The request is, for example, a command. Hereinafter, a request is also referred to as a command.

Each of the one or more submission queues 222 is a queue for storing a command issued by the host 2 for the memory system 3. Thus, the host 2 transmits commands to the memory system 3 via the submission queues 222. Each submission queue 222 includes multiple slots to which the host 2 writes commands, respectively, which are issued for the memory system 3. A location in each submission queue 222 (that is, a slot) to which the host 2 should write a command is indicated by an SQ tail pointer. A head location in each submission queue 222 from which the memory system 3 should fetch a command is indicated by an SQ head pointer.

The host 2 writes (i.e., issues) a command to a location in the submission queue 222 that is indicated by the SQ tail pointer. Then, the host 2 adds one to the SQ tail pointer. When the value obtained by adding one to the SQ tail pointer reaches the number of slots of the submission queue 222 (that is, the queue size), the host 2 sets the SQ tail pointer to zero. Then, the host 2 writes the updated value of the SQ tail pointer to an SQ tail doorbell register of the memory system 3.

In the example illustrated in FIG. 1, three commands are stored in the submission queue 222. The number of commands stored in the submission queue 222 corresponds to the difference between the SQ head pointer and the SQ tail pointer.

The memory system 3 includes, for example, a nonvolatile memory 4, a DRAM 5, and a controller 6.

The nonvolatile memory 4 includes one or more nonvolatile memory chips 41. The nonvolatile memory chips 41 are, for example, N nonvolatile memory chips 41-1, . . . , and 41-N, where N is an integer of one or more. Hereinafter, this specification mainly describes a case where the nonvolatile memory 4 includes the N nonvolatile memory chips 41-1, . . . , and 41-N as an example. Any one of the N nonvolatile memory chips 41-1, . . . , and 41-N is also simply referred to as a nonvolatile memory chip 41. Further, the k-th nonvolatile memory chip of the N nonvolatile memory chips 41-1, . . . , and 41-N is referred to as a k-th nonvolatile memory chip 41-$k$.

The nonvolatile memory chip 41 includes a memory cell array 31 and a page buffer 32.

The memory cell array 31 includes multiple blocks each including a plurality of memory cells arranged in matrix. The blocks each function as a minimum unit of a data erase operation. The block may also be referred to as an erase block or a physical block. Each of the blocks includes multiple pages. Each of the pages includes a plurality of memory cells connected to a single word line. The pages each function as a unit of a data write operation and a data read operation. Note that a word line may also function as a unit of a data write operation and a data read operation.

The page buffer 32 is composed of, for example, an SRAM. The page buffer 32 temporarily stores data transferred between the controller 6 and the nonvolatile memory chip 41.

In a data write operation, data received from the controller 6 is temporarily stored in the page buffer 32, and then is programmed into the memory cell array 31. Hereinafter, an operation of temporarily storing data received from the controller 6 in the page buffer 32 is referred to as a data-in operation. An operation of programming data temporarily stored in the page buffer 32 into the memory cell array 31 is referred to as a program operation.

The tolerable maximum number of program/erase cycles (maximum number of P/E cycles) for each of the blocks is limited. One P/E cycle of a block includes a data erase operation to erase data stored in all memory cells in the block and a data write operation (data program operation) to write data in each page of the block.

The DRAM 5 is a volatile memory. The DRAM 5 includes, for example, a storage area of firmware (FW), a storage area of a memory chip management table 51 and a command management table 52, and a buffer area that temporarily stores data. The buffer area is, for example, a write buffer 53 that temporarily stores user data to be written into the nonvolatile memory 4.

The FW is a program for controlling an operation of the controller 6. The FW is loaded from the nonvolatile memory 4 to the DRAM 5, for example.

The memory chip management table 51 is a table for managing an operation state of each of the N nonvolatile memory chips 41. A specific example of a configuration of the memory chip management table 51 will be described later with reference to FIG. 3.

The command management table 52 is a table for managing a command fetched from the submission queues 222 of the host 2. A specific example of a configuration of the command management table 52 will be described later with reference to FIG. 4.

The controller 6 may be implemented with a circuit such as a system-on-a-chip (SoC). The controller 6 is configured to control the nonvolatile memory 4. The function of each unit of the controller 6 may be realized by dedicated hardware in the controller 6 or may be realized by a processor executing the FW.

The controller 6 may function as a flash translation layer (FTL) configured to execute data management and block management of the nonvolatile memory 4. The data management executed by the FTL includes (1) management of mapping data indicative of a relationship between each logical address and each physical address of the nonvolatile memory 4, and (2) process to hide a difference between data read/data write operations in units of page and data erase operations in units of block. The block management includes management of defective blocks, wear leveling, and garbage collection.

The logical address is used by the host 2 for addressing a storage area of the memory system 3. The logical address is, for example, a logical block address (LBA).

Management of mapping between each logical address and each physical address is executed by using, for example, a logical-to-physical address translation table. The controller 6 uses the logical-to-physical address translation table to manage the mapping between each logical address and each physical address in a certain management size. A physical address corresponding to a logical address indicates a physical memory location in the nonvolatile memory 4 to which data of the logical address is written. The controller 6 manages multiple storage areas that are obtained by logically dividing the storage area of the nonvolatile memory 4, using the logical-to-physical address translation table. These multiple storage areas correspond to multiple logical addresses, respectively. In other words, each of the storage areas is identified by one logical address. The logical-to-physical address translation table may be loaded from the nonvolatile memory 4 to the DRAM 5 when the memory system 3 is boot up.

The data write operation into one page is executable only once in a single P/E cycle. Thus, the controller 6 writes updated data corresponding to a logical address not to an original physical memory location in which previous data corresponding to the logical address is stored but to a different physical memory location. Then, the controller 6 updates the logical-to-physical address translation table to associate the logical address with this different physical memory location rather than the original physical memory location and to invalidate the previous data (i.e., data stored in the original physical memory location). Data to which the logical-to-physical address translation table refers (that is, data associated with a logical address) is referred to as valid data. Furthermore, data not associated with any logical address is referred to as invalid data. The valid data is data to possibly be read by the host 2 later. The invalid data is data not to be read by the host 2 anymore.

The controller 6 includes, for example, a DRAM interface (DRAM I/F) 11 and a memory controller 12. The DRAM I/F 11 and the memory controller 12 are connected to via, for example, a bus 10. The controller 6 may further include an SRAM 13. In this case, the storage area of the SRAM 13 may be allocated as at least one of the storage area of the memory chip management table 51, the storage area of the command management table 52, and the write buffer 53.

The DRAM I/F 11 functions as a DRAM control circuit configured to control access to the DRAM 5.

The memory controller 12 is configured to control various processes on the nonvolatile memory 4. The memory controller 12 includes a front-end unit 121 and a back-end unit 122.

The front-end unit 121 controls communication between the host 2 and the memory system 3. By the communication, for example, commands and data are transmitted from the host 2 to the memory system 3.

Specifically, the front-end unit 12 performs a fetch control operation. The fetch control operation is an operation of identifying a command to be fetched from the submission queues 222 of the host 2 and fetching the identified command. The command to be fetched is, for example, an input/output (I/O) command or a control command. The I/O command may be a write command or a read command. The control command may be an unmap command (trim command) or a format command.

Note that each command may designate a target nonvolatile memory chip 41. Specifically, each command includes, for example, identification information assigned to the target nonvolatile memory chip 41 (i.e., chip ID). Alternatively, each command may include identification information assigned to a target super block. Each super block consists of a plurality of physical blocks that are included in one or more nonvolatile memory chips 41. Thus, each command may indirectly designate a nonvolatile memory chip 41 by including identification information assigned to the target super block.

For example, in the fetch control operation, the front-end unit 121 identifies a command to be fetched on the basis of a state of a nonvolatile memory chip 41 designated by each command in the submission queues 222. The front-end unit 121 fetches the identified command. The front-end unit 121 then manages the fetched command. For the management of the fetched command, for example, the command management table 52 is used. A specific example of the fetch control operation will be described later with reference to FIG. 7 to FIG. 13.

The front-end unit 121 includes a memory area 61. The memory area 61 is a memory area for temporarily storing data, such as a register. The memory area 61 is allocated as, for example, a storage area of an SQ head pointer 611, an SQ tail doorbell register, and a storage area of an SQ bitmap 613. To the SQ tail doorbell register, the value of the SQ tail pointer managed by the host 2 is written. Hereinafter, the value stored in the SQ tail doorbell register in the memory area 61 is referred to as an SQ tail pointer 612.

The SQ bitmap 613 is bit string data that indicates a fetch state of a command stored in each of the slots from a slot indicated by the SQ head pointer 611 to a slot that is one-slot before a slot indicated by the SQ tail pointer 612. The SQ bitmap 613 includes, for example, as many bits as the slots of a corresponding submission queue 222. The fetch state is one of a state in which a command has already been fetched (fetched) and a state in which a command is not fetched yet (yet-to-be-fetched). A specific example of a configuration of the SQ bitmap 613 will be described later with reference to FIG. 8.

In a case where the host 2 includes multiple submission queues 222, a plurality of sets each including an SQ head pointer 611, an SQ tail pointer 612, and an SQ bitmap 613 are stored in the memory area 61. Each set stored in the memory area 61, which includes the SQ head pointer 611, the SQ tail pointer 612, and the SQ bitmap 613, is associated with one of the submission queues 222 of the host 2. The sets each including the SQ head pointer 611, the SQ tail pointer 612, and the SQ bitmap 613 may be stored in a volatile memory such as the SRAM 13.

The front-end unit 121 uses the SQ head pointer 611 and the SQ tail pointer 612 to manage the number of commands stored in the corresponding submission queue 222. Specifically, the front-end unit 121 calculates the number of commands stored in the corresponding submission queue 222 on the basis of the difference between the SQ head pointer 611 and the SQ tail pointer 612. The front-end unit 121 manages a command that has been already fetched and a command that is not yet fetched from each submission queue 222 by using, for example, the SQ bitmap 613.

The back-end unit 122 electrically connects the controller 6 and the nonvolatile memory 4. The back-end unit 122 conforms to an interface standard such as a toggle double data rate (DDR) and an open NAND flash interface (ONFI).

The back-end unit 122 functions as a memory control circuit configured to control the nonvolatile memory 4. The back-end unit 122 may be connected to the nonvolatile memory chips 41 via multiple channels respectively. By operating the nonvolatile memory chips 41 in parallel, it is possible to broaden an access bandwidth between the controller 6 and the nonvolatile memory 4.

The front-end unit 121 and the back-end unit 122 perform a command execution operation and a busy state management operation.

The command execution operation is an operation for executing a process in accordance with a fetched command. Specifically, when the fetched command is a write command, the command execution operation includes a data transfer operation and a data write operation. The data transfer operation is an operation in which the front-end unit 121 transfers user data, which is to be written into the nonvolatile memory 4 in accordance with the fetched write command, from the data buffer 221 of the host 2 to the write buffer 53 of the memory system 3. The data write operation is an operation in which the back-end unit 122 writes the user data into the nonvolatile memory 4, on the basis of the fetched write command. The data write operation includes a data-in operation and a program operation.

The busy state management operation is an operation for managing a busy state of each of the N nonvolatile memory chips 41. The busy state is a state in which a program operation is in progress in the nonvolatile memory chip 41. Alternatively, the busy state may be a state in which a program operation is in progress in the nonvolatile memory chip 41 and user data to be written in the next program operation has already been stored in the write buffer 53. Note that a state that is not the busy state is also referred to as an idle state.

In the busy state management operation, the back-end unit 122 determines whether or not each nonvolatile memory chip 41 is in the busy state and notifies the front-end unit 121 of information on the busy state. The information on the busy state includes, for example, information indicative of either start or end of the busy state in each nonvolatile memory chip 41. The front-end unit 121 updates the memory chip management table 51 to indicate the current state of each nonvolatile memory chip 41 on the basis of the notification by the back-end unit 122. The front-end unit 121 and the back-end unit 122 thus manage the busy state of each nonvolatile memory chip 41.

A specific example of the command execution operation and the busy state management operation will be described later with reference to FIG. 6.

Here, a relationship between fetch of commands from the submission queues 222 and resources of the memory system 3 will be explained. The resources of the memory system 3 are consumed in accordance with fetching a command from the submission queues 222. When the resources are insufficient, the processing efficiency (throughput) of the memory system 3 in accordance with commands from the host 2 may be reduced.

FIG. 2 illustrates an example in which resources of a memory system 3A according to a comparative example become insufficient as write commands are fetched from the submission queues 222 of the host 2. In some cases, the host 2 designates a nonvolatile memory chip to which user data is to be written in accordance with a write command. In this case, the processing efficiency of the memory system 3A is reduced depending on a method by which the host 2 designates a nonvolatile memory chip.

Specifically, when a write command is fetched from the submission queues 222 of the host 2, the resources of the memory system 3A are consumed in accordance with the fetched write command. The consumed resources include, for example, a resource for managing the fetched write command (for example, a command management table), the bus bandwidth between the host 2 and the memory system 3A for transferring user data to be written into the nonvolatile memory chip in accordance with the fetched write command, and a resource for temporarily storing the transferred user data (for example, a write buffer). Insufficiency of the resources may reduce the processing efficiency of the memory system 3A. For example, when a free area of the command management table is insufficient, the memory system 3A cannot fetch a new write command from the submission queues 222. Further, for example, when the bus bandwidth between the host 2 and the memory system 3A is insufficient, or when a free area of the write buffer is insufficient, the memory system 3A cannot transfer user data corresponding to the fetched write command from the host 2 to the memory system 3A.

In the example illustrated in FIG. 2, four jobs J0, J1, J2, and J3 are executed in the host 2. Each of the jobs J0, J1, J2, and J3 is, for example, a process by an application program executed on the host 2. Here, it is assumed that, in all the jobs J0, J1, J2, and J3, a large number of write commands that designate each of multiple nonvolatile memory chips are issued in a specific order.

Specifically, first, in each of the jobs J0, J1, J2, and J3, a large number of write commands that designate a first nonvolatile memory chip are issued. In the memory system 3A, the issued write commands are fetched, and the resources are consumed. Then, for the first nonvolatile memory chip, a queue C1 including the large number of write commands whose command execution operations have not been completed (in other words, write commands which wait for non-volatilization) is formed. The hatching appended to each of the illustrated write commands indicates that the corresponding command is issued in the job to which the same hatching is appended.

Next, a large number of write commands that designate a second nonvolatile memory chip are issued in each of the jobs J0, J1, J2, and J3. In the memory system 3A, the issued write commands are fetched, and the resources are consumed. Then, for the second nonvolatile memory chip, a queue C2 including the large number of write commands is formed.

Subsequently, a large number of write commands that designate a third nonvolatile memory chip are issued in each of jobs J0, J1, J2, and J3. In the memory system 3A, the issued write commands are fetched, and the resources are consumed. Then, for the third nonvolatile memory chip, a queue C3 including the large number of write commands is formed.

Further, a large number of write commands that designate a fourth nonvolatile memory chip are issued in each of jobs J0, J1, J2, and J3. In the memory system 3A, the resources (for example, the free area of the command management table or the free area of the write buffer) are depleted before all the issued write commands are fetched. Thus, for example, the memory system 3A cannot fetch write commands for a fifth or subsequent nonvolatile memory chip.

In the memory system 3A, user data to be written into the nonvolatile memory chips is transferred from the host 2 in accordance with the fetched write commands. However, when a large number of write commands are issued and fetched for a single nonvolatile memory chip, user data that is not immediately programmed may be transferred from the host 2 and stored in the write buffer. This indicates that the bus bandwidth between the host 2 and the memory system 3A and the storage area of the write buffer are wasted because of the user data that is not immediately programmed. Such user data, which is not immediately programmed, for example, may cause a delay in transfer of another user data from the host 2 to another nonvolatile memory chip which can immediately start a data-in operation and a program operation.

Thus, in the case illustrated in FIG. 2, the processing efficiency of the memory system 3A may be reduced because of insufficient resources. In addition, for example, in a case where a command issued in each of the jobs J0, J1, J2, and J3 randomly designates one of the nonvolatile memory chips, there is a possibility that time points at which resources are released become random, the resources cannot be effectively used, and the processing efficiency is reduced. However, if the resources provided in the memory system 3A are increased to prevent the lack of resources, the cost of the memory system 3A is increased. If restrictions are applied on the method by which the host 2 designates a nonvolatile memory chip to ease the lack of resources, the method needs to be changed depending on a vendor or a model of a memory system, and thus, the commonality of host software cannot be achieved.

The reduction in processing efficiency because of insufficient resources in the memory system 3A is caused by fetching a command stored in each submission queue 222 in order from the head and starting a process in accordance with the fetched command.

By contrast, in the embodiment, the controller 6 is configured to identify a command designating a nonvolatile memory chip 41 that is not in the busy state from one or more commands stored in the submission queues 222 and perform a process in accordance with the identified command. By this configuration, it is possible to prevent a command for the nonvolatile memory chip 41 in the busy state from wasting the resources of the memory system 3. Therefore, the processing efficiency of the memory system 3 can be improved.

Here, with reference to FIG. 3 to FIG. 5, the memory chip management table 51, the command management table 52, and the write buffer 53 that are used in the memory system 3 will be specifically explained.

FIG. 3 illustrates an example of a configuration of the memory chip management table 51. The memory chip management table 51 includes, for example, N entries. The N entries correspond to the N nonvolatile memory chips 41, respectively. Each of the N entries includes a chip ID field and a state field.

The chip ID field indicates a chip ID of a corresponding nonvolatile memory chip 41. The chip ID is information by which the corresponding nonvolatile memory chip 41 of the N nonvolatile memory chips 41 is uniquely identifiable.

The state field indicates a state of the corresponding nonvolatile memory chip 41. More specifically, the state field indicates whether or not the corresponding nonvolatile memory chip 41 is in the busy state. In the state field, for example, one of "busy" indicative of the busy state and "idle" indicative of the idle state is set.

In the example illustrated in FIG. 3, the first nonvolatile memory chip 41-1 whose chip ID is "1" is in the busy state. The second nonvolatile memory chip 41-2 whose chip ID is "2" is in the idle state. The third nonvolatile memory chip 41-3 whose chip ID is "3" is in the idle state. The N-th nonvolatile memory chip 41-N whose chip ID is "N" is in the busy state.

FIG. 4 illustrates an example of a configuration of the command management table 52. The command management table 52 includes one or more entries. The one or more entries correspond to, respectively, for example, one or more commands which have been fetched and for which corresponding processes have not been completed. Each of the entries includes, for example, a command information field.

The command information field indicates information on a corresponding command. The information on a command includes, for example, identification information of the command (tag), the type of the command (here, write command), identification information of a designated nonvolatile memory chip 41 (chip ID), a designated logical address range, and information indicative of a memory location in the host 2 in which user data to be written is stored. The information on a command may include information of the command fetched from the submission queues 222 as it is.

In the example illustrated in FIG. 4, a write command cmdA and a write command cmdB each of which designates the first nonvolatile memory chip 41-1 having the chip ID "1" are managed. In other words, the write command cmdA and the write command cmdB are commands which have been fetched and for which corresponding processes have not been completed.

For example, when a command has been fetched from the submission queues 222, an entry corresponding to the command is added to the command management table 52. For example, when a process corresponding to a command has been completed (for example, when a completion response (completion) corresponding to the command has been stored in a completion queue (not illustrated) of the host 2), an entry corresponding to the command is deleted from the command management table 52. Hereinafter, adding an entry corresponding to a command to the command management table 52 may be simply referred to as adding a command to the command management table 52.

FIG. 5 illustrates an example of user data stored in the write buffer 53. Here, this specification describes a case where user data 53A and user data 53B are stored by command execution operations based on the command management table 52 in the state illustrated in FIG. 4.

The user data 53A is user data to be written into the first nonvolatile memory chip 41-1 in accordance with the write command cmdA. The user data 53B is user data to be written into the first nonvolatile memory chip 41-1 in accordance with the write command cmdB.

The states of the memory chip management table 51 of FIG. 3, the command management table 52 of FIG. 4, and the write buffer 53 of FIG. 5 correspond to the first nonvolatile memory chip 41-1 in the busy state. More specifically, these tables indicate that the first nonvolatile memory chip 41-1 is in the busy state where a program operation for writing the user data 53A in accordance with the write command cmdA is in progress, and the user data 53B to be written in accordance with the next write command cmdB has already been stored in the write buffer 53.

Next, operations of the front-end unit 121 and the back-end unit 122 will be explained with reference to FIG. 6 to FIG. 13. To simplify explanation, as an example, this specification hereinafter describes a case where all commands stored in the submission queues 222 are write commands. Note that other types of commands may be stored in the submission queues 222.

Figure 6:
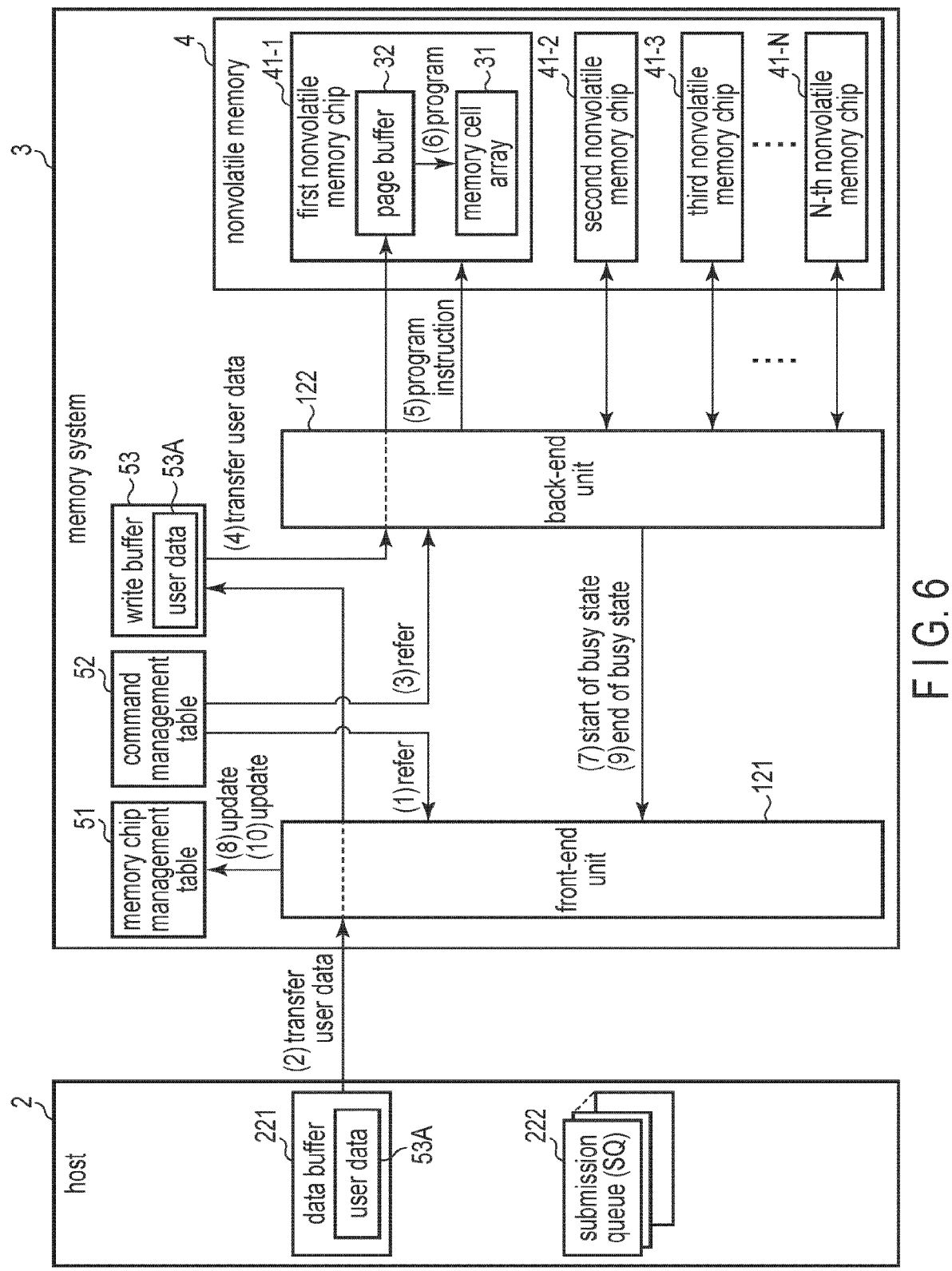
FIG. 6 is a diagram illustrating an example of a command execution operation and a busy state management operation in the memory system according to the first embodiment.

FIG. 6 illustrates an example of the command execution operation and the busy state management operation performed by the front-end unit 121 and the back-end unit 122. As described above, the command execution operation is an operation for executing a process in accordance with a fetched command. The busy state management operation is an operation for managing the busy states of the nonvolatile memory chips 41.

First, the command execution operation will be explained.

Here, it is assumed that, in the command management table 52, the write command cmdA for which corresponding command execution operation is not started yet is managed. User data to be written into the nonvolatile memory 4 in accordance with the write command cmdA is the user data 53A. The write command cmdA designates the first nonvolatile memory chip 41-1 as a write destination of the user data 53A.

The front-end unit 121 obtains command information of the write command cmdA (hereinafter, referred to as first command information) with reference to the command management table 52 ((1) in FIG. 6). The first command information includes, for example, information indicative of a memory location in the host 2 in which the user data 53A is stored, and the chip ID of the first nonvolatile memory chip 41-1 that is designated as the write destination of the user data 53A.

The front-end unit 121 transfers the user data 53A from the data buffer 221 of the host 2 to the write buffer 53 of the memory system 3 on the basis of the obtained first command information ((2) in FIG. 6). Specifically, the front-end unit 121 receives, from the host 2, the user data 53A read from the data buffer 221 on the basis of the first command information. Then, the front-end unit 121 stores the received user data 53A in the write buffer 53. The front-end unit 121 may notify the back-end unit 122 of completion of storage of the user data 53A in the write buffer 53.

Subsequently, the back-end unit 122 obtains the first command information with reference to the command management table 52 ((3) in FIG. 6). The back-end unit 122 performs a data-in operation for transferring the user data 53A stored in the write buffer 53 to the page buffer 32 of the first nonvolatile memory chip 41-1 on the basis of the obtained first command information ((4) in FIG. 6). Then, the back-end unit 122 instructs the first nonvolatile memory chip 41-1 to write (program) the user data 53A stored in the page buffer 32 into the memory cell array 31 of the first nonvolatile memory chip 41-1 ((5) in FIG. 6). In response to this instruction, a program operation for writing the user data 53A into the memory cell array 31 is performed in the first nonvolatile memory chip 41-1 ((6) in FIG. 6).

The back-end unit 122 can perform a process in accordance with each command managed in the command management table 52 for each of the other nonvolatile memory chips 41-2, 41-3, . . . , and 41-N in a similar manner.

In this manner, the front-end unit 121 and the back-end unit 122 can perform a process in accordance with a fetched command by using the command management table 52.

Next, the busy state management operation will be explained.

The back-end unit 122 manages the state of each of the N nonvolatile memory chips 41-1, 41-2, 41-3, . . . , and 41-N. Specifically, the back-end unit 122 determines whether or not a program operation for each of the N nonvolatile memory chips 41-1, 41-2, 41-3, . . . , and 41-N is in progress. Further, the back-end unit 122 may determine whether or not user data corresponding to a write command that is to be executed next for each of the N nonvolatile memory chips 41-1, 41-2, 41-3, . . . , and 41-N has already been stored in the write buffer 53, on the basis of the command management table 52 and user data stored in the write buffer 53.

When a nonvolatile memory chip 41 has transitioned from the idle state to the busy state, the back-end unit 122 notifies the front-end unit 121 of start of the busy state of the nonvolatile memory chip 41 ((7) in FIG. 6). When a program operation has been started in a nonvolatile memory chip 41, the back-end unit 122 determines that the nonvolatile memory chip 41 has transitioned to the busy state. Alternatively, when a program operation has been started in a nonvolatile memory chip 41 and user data corresponding to a write command that is to be executed next for the nonvolatile memory chip 41 has been stored in the write buffer 53, the back-end unit 122 may determine that the nonvolatile memory chip 41 has transitioned to the busy state. Further, when user data corresponding to a write command that is to be executed next for a nonvolatile memory chip 41 has been stored in the write buffer 53 during a program operation in the nonvolatile memory chip 41, the back-end unit 122 may determine that the nonvolatile memory chip 41 has transitioned to the busy state.

The front-end unit 121 updates the memory management table 51 in accordance with the notification of the start of the busy state of the nonvolatile memory chip 41 from the back-end unit 122 ((8) in FIG. 6). Specifically, the front-end unit 121 updates the memory chip management table 51 so as to indicate that the nonvolatile memory chip 41 is in the busy state.

When a nonvolatile memory chip 41 has transitioned from the busy state to the idle state, the back-end unit 122 notifies the front-end unit 121 of end of the busy state of the nonvolatile memory chip 41 ((9) in FIG. 6). When a program operation has been completed in a nonvolatile memory chip 41, the back-end unit 122 determines that the nonvolatile memory chip 41 has transitioned to the idle state. Alternatively, when user data corresponding to a write command that is to be executed next for a nonvolatile memory chip 41 is not stored in the write buffer 53, the back-end unit 122 may determine that the nonvolatile memory chip 41 has transitioned to the idle state.

The front-end unit 121 updates the memory chip management table 51 in accordance with the notification of the end of the busy state of the nonvolatile memory chip 41 from the back-end unit 122 ((10) in FIG. 6). Specifically, the front-end unit 121 updates the memory chip management table 51 so as to indicate that the nonvolatile memory chip 41 is in the idle state.

Note that the back-end unit 122 may update the memory chip management table 51 in accordance with start of the busy state of a nonvolatile memory chip 41 or end of the busy state of the nonvolatile memory chip 41. In this case, the front-end unit 121 can determine whether or not the nonvolatile memory chip 41 is in the busy state by referring to the memory chip management table 51 updated by the back-end unit 122.

In this manner, the front-end unit 121 and the back-end unit 122 can manage the state of each nonvolatile memory chip 41 regarding whether or not each nonvolatile memory chip 41 is in the busy state by using the memory chip management table 51.

Next, with reference to FIG. 7 to FIG. 13, the fetch control operation performed by the front-end unit 121 will be explained. In the following description, a case where the host 2 includes four submission queues 222 and the number of slots of each submission queue 222 is five. The four submission queues 222 are a first submission queue 222-1, a second submission queue 222-2, a third submission queue 222-3, and a fourth submission queue 222-4.

FIG. 7 illustrates an example of commands fetched from the submission queues 222-1, 222-2, 222-3, and 222-4 by the fetch control operation.

The first submission queue 222-1 includes five slots 711, 712, 713, 714, and 715. The slot 711 is the first slot specified by the SQ head pointer 611 that corresponds to the first submission queue 222-1. In other words, the first command of the first submission queue 222-1 is stored in the slot 711.

Five write commands are stored in the five slots 711, 712, 713, 714, and 715, respectively. The order of the slots 711, 712, 713, 714, and 715 corresponds to the order of storing the five write commands in the first submission queue 222-1. These five write commands are commands that are not fetched yet by the front-end unit 121.

The write command stored in each of the slots 711 and 712 designates a nonvolatile memory chip 41 in the busy state. The write command stored in each of the slots 713, 714, and 715 designates a nonvolatile memory chip 41 in the idle state. The write command stored in the slot 711 is referred to as a write command cmdC. The write command stored in the slot 712 is referred to as a write command cmdD. The write command stored in the slot 713 is referred to as a write command cmdE. The write command stored in the slot 714 is referred to as a write command cmdF.

The second submission queue 222-2 includes five slots 721, 722, 723, 724, and 725. The slot 721 is the first slot specified by the SQ head pointer 611 that corresponds to the second submission queue 222-2. In other words, the first command of the second submission queue 222-2 is stored in the slot 721.

Four write commands are stored in the four slots 721, 722, 723, and 724, respectively. The order of the four slots 721, 722, 723, and 724 corresponds to the order of storing the four write commands in the second submission queue 222-2. The four write commands are commands that are not fetched yet by the front-end unit 121. Each of the four write commands designates a nonvolatile memory chip 41 in the idle state. The write command stored in the slot 721 is referred to as a write command cmdG. The slot 725 illustrated with a blank is a slot in which no command is stored.

The third submission queue 222-3 includes five slots 731, 732, 733, 734, and 735. The slot 731 is the first slot specified by the SQ head pointer 611 that corresponds to the third submission queue 222-3. In other words, the first command of the third submission queue 222-3 is stored in the slot 731.

Three write commands are stored in the slots 731, 732, and 733, respectively. The order of the slots 731, 732, and 733 corresponds to the order of storing the three write commands in the third submission queue 222-3. The three write commands are commands that are not fetched yet by the front-end unit 121.

The write command stored in the slot 731 designates a nonvolatile memory chip 41 in the busy state. The write command stored in each of the slots 732 and 733 designates a nonvolatile memory chip 41 in the idle state. The write command stored in the slot 731 is referred to as a write command cmdH. The write command stored in the slot 732 is referred to as a write command cmdI. Each of the slots 734 and 735 illustrated with a blank is a slot in which no command is stored.

The fourth submission queue 222-4 includes five slots 741, 742, 743, 744, and 745. The slot 741 is the first slot specified by the SQ head pointer 611 that corresponds to the fourth submission queue 222-4. In other words, the first command of the fourth submission queue 222-4 is stored in the slot 741.

Four write commands are stored in the slots 741, 742, 743, and 744, respectively. The order of the slots 741, 742, 743, and 744 corresponds to the order of storing the four write commands in the fourth submission queue 222-4. The four write commands are commands that are not fetched yet by the front-end unit 121. Each of the four write commands designates a nonvolatile memory chip 41 in the busy state. The write command stored in the slot 741 is referred to as a write command cmdJ. The slot 745 illustrated with a blank is a slot in which no command is stored.

The front-end unit 121 selects a submission queue 222 from which a command is to be fetched from the four submission queues 222-1, 222-2, 222-3, and 222-4 by arbitration. As a mechanism of arbitration, for example, round-robin or weighted round-robin specified in the NVMe standard is used. The front-end unit 121 is configured to fetch a write command that designates a nonvolatile memory chip 41 in the idle state from the selected submission queue 222 and not to fetch a write command that designates a nonvolatile memory chip 41 in the busy state from the selected submission queue 222.

Specifically, when the first submission queue 222-1 has been selected by arbitration, the front-end unit 121 fetches neither the write command cmdC of the slot 711 nor the write command cmdD of the slot 712 and fetches the write command cmdE of the slot 713. When the second submission queue 222-2 has been selected by arbitration, the front-end unit 121 fetches the write command cmdG of the slot 721. When the third submission queue 222-3 has been selected by arbitration, the front-end unit 121 does not fetch the write command cmdH of the slot 731 and fetches the write command cmdI of the slot 732. When the fourth submission queue 222-4 has been selected by arbitration, the front-end unit 121 does not fetch any write command from the fourth submission queue 222-4.

The front-end unit 121 manages write commands that have been already fetched from each submission queue 222 and write commands that are not fetched yet by, for example, using the SQ bitmap 613.

FIG. 8 illustrates an example of the SQ bitmap 613. The SQ bitmap 613 is, for example, bit string data indicative of fetch states of write commands that are stored in the slots from a slot indicated by the SQ head pointer 611 of a corresponding submission queue 222 to a slot that is one-slot before a slot indicated by the SQ tail pointer 612 of the corresponding submission queue 222. The slot indicated by the SQ head pointer 611 is also referred to as a first slot. The slot one-slot before the slot indicated by the SQ tail pointer 612 is also referred to as an end slot. Each bit of the SQ bitmap 613 from its head corresponds to, for example, a write command stored in each of the slots from the first slot to the end slot in order. Here, for example, it is assumed that a bit of the SQ bitmap 613 corresponding to a write command is set to zero when the write command is not fetched yet and is set to one when the write command has been already fetched.

An SQ bitmap 613-1 illustrated in FIG. 8(a) indicates that none of the write commands stored in a corresponding submission queue 222 is fetched yet. In the SQ bitmap 613-1, the first bit b1 corresponds to a write command stored in the first slot. In the first bit b1, zero is set. That is, the first bit b1 indicates that the write command stored in the first slot is not fetched yet.

In addition, in each of the subsequent bits b2, b3, b4, and b5, zero is set. Thus, the SQ bitmap 613-1 indicates that none of the write commands stored in the corresponding submission queue 222 is fetched yet.

Subsequently, for example, when a write command stored in the third slot of the submission queue 222 (referred to as a third write command) has been fetched, the SQ bitmap 613-1 is updated so as to be an SQ bitmap 613-2 illustrated in FIG. 8(b).

In the SQ bitmap 613-2, the value set in the third bit b3 is changed from zero to one. In other words, the third bit b3 indicates that the third write command has been already fetched.

In each of the other bits b1, b2, b4, and b5, zero is still set. Thus, the SQ bitmap 613-2 indicates that the third write command stored in the submission queue 222 has already been fetched and the other commands are not fetched yet.

Further, for example, when a write command stored in the first slot of the submission queue 222 (referred to as a first write command) has been fetched, the SQ bitmap 613-2 is updated so as to be an SQ bitmap 613-3 illustrated in FIG. 8(c). Specifically, in response to the fetch of the first write command, the SQ head pointer 611 of the submission queue 222 is updated. The updated SQ head pointer 611 specifies the original second slot (that is, the slot corresponding to the second bit b2) as a new first slot. Thus, the SQ bitmap 613-3 becomes, for example, a bit string including the second bit b2 and the subsequent bits, which is obtained by excluding the first bit b1 from the previous SQ bitmap 613-2. That is, the SQ bitmap 613-3 is a bit string in which the bit string including the second bit b2 and the subsequent bits in the original SQ bitmap 613-2 is shifted in the direction to the head by one bit.

Thus, the SQ bitmap 613-3 indicates that a write command stored in the second slot of the submission queue 222, which was the previous third command, has already been fetched and the other commands are not fetched yet.

By using the SQ bitmap 613, the front-end unit 121 can trace a fetched write command and a yet-to-be-fetched write command in each submission queue 222.

Note that the front-end unit 121 may manage a pointer that indicates a bit location in the SQ bitmap 613 that corresponds to the first slot of the submission queue 222. In this case, when the first write command stored in the first slot of the submission queue 222 has been fetched, the front-end unit 121 may specify a bit location in the SQ bitmap 613 that corresponds to the new first slot of the submission queue 222 by updating this pointer instead of shifting the bit string of the SQ bitmap 613.

With reference to FIG. 9 to FIG. 12, examples of the fetch control operation will be explained. The write commands that are stored in the four submission queues 222-1, 222-2, 222-3, and 222-4 are as explained above with reference to FIG. 7. In the following explanation, it is assumed that, as in the case of the memory chip management table illustrated in FIG. 3, the first nonvolatile memory chip 41-1 and the N-th nonvolatile memory chip 41-N are in the busy state, and the second nonvolatile memory chip 41-2 and the third nonvolatile memory chip 41-3 are in the idle state. In addition, it is assumed that the state of each nonvolatile memory chip 41 does not change during the fetch control operation illustrated in FIG. 9 to FIG. 12.

Figure 9:
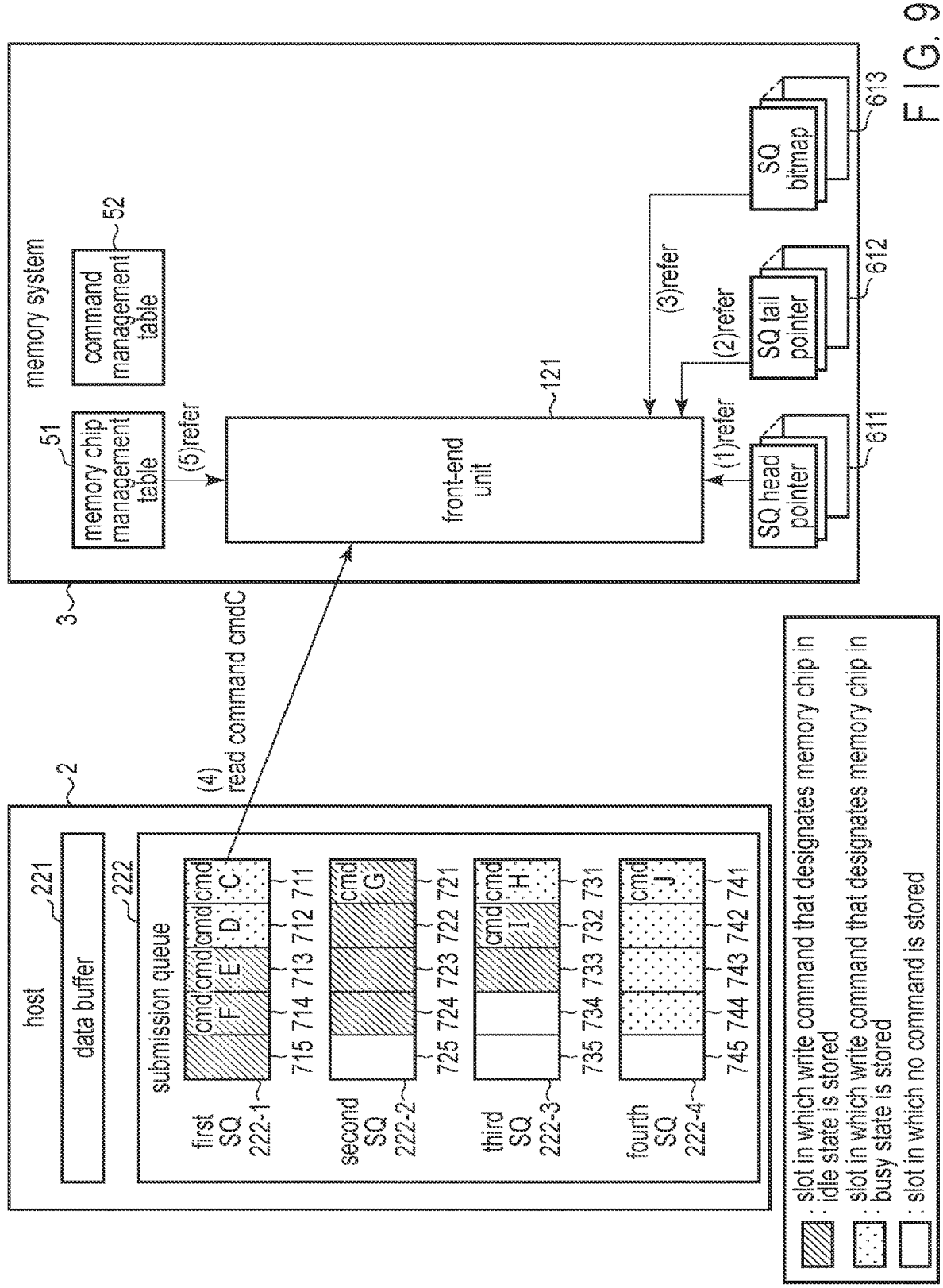
FIG. 9 is a diagram illustrating a first example of the fetch control operation in the memory system according to the first embodiment.

FIG. 9 illustrates an example of the fetch control operation. Here, the first submission queue 222-1 is selected by arbitration as a target submission queue 222 for fetch.

The front-end unit 121 determines that commands are stored in the first submission queue 222-1 with reference to the SQ head pointer 611 and the SQ tail pointer 612 that correspond to the first submission queue 222-1 ((1) and (2) in FIG. 9). Specifically, the front-end unit 121 determines that commands are stored in the first submission queue 222-1 when the SQ head pointer 611 is different from the SQ tail pointer 612.

Subsequently, the front-end unit 121 refers to the SQ bitmap 613 that corresponds to the first submission queue 222-1 ((3) in FIG. 9). The SQ bitmap 613 that is referred to corresponds to, for example, the SQ bitmap 613-1 of FIG. 8(a) indicating that none of the write commands is fetched yet. The front-end unit 121 reads the write commands that are not fetched yet in order from the head of the first submission queue 222-1 on the basis of the SQ head pointer 611 and the SQ bitmap 613. Thus, the front-end unit 121 firstly reads the write command cmdC from the first slot 711 of the first submission queue 222-1 ((4) in FIG. 9). The front-end unit 121 determines that the nonvolatile memory chip 41 designated in the read write command cmdC (for example, the first nonvolatile memory chip 41-1) is in the busy state with reference to the memory chip management table 51 ((5) in FIG. 9). Thus, the front-end unit 121 does not fetch the write command cmdC. Specifically, for example, the front-end unit 121 discards data of the read write command cmdC and updates neither the SQ head pointer 611 nor the SQ bitmap 613.

Figure 10:
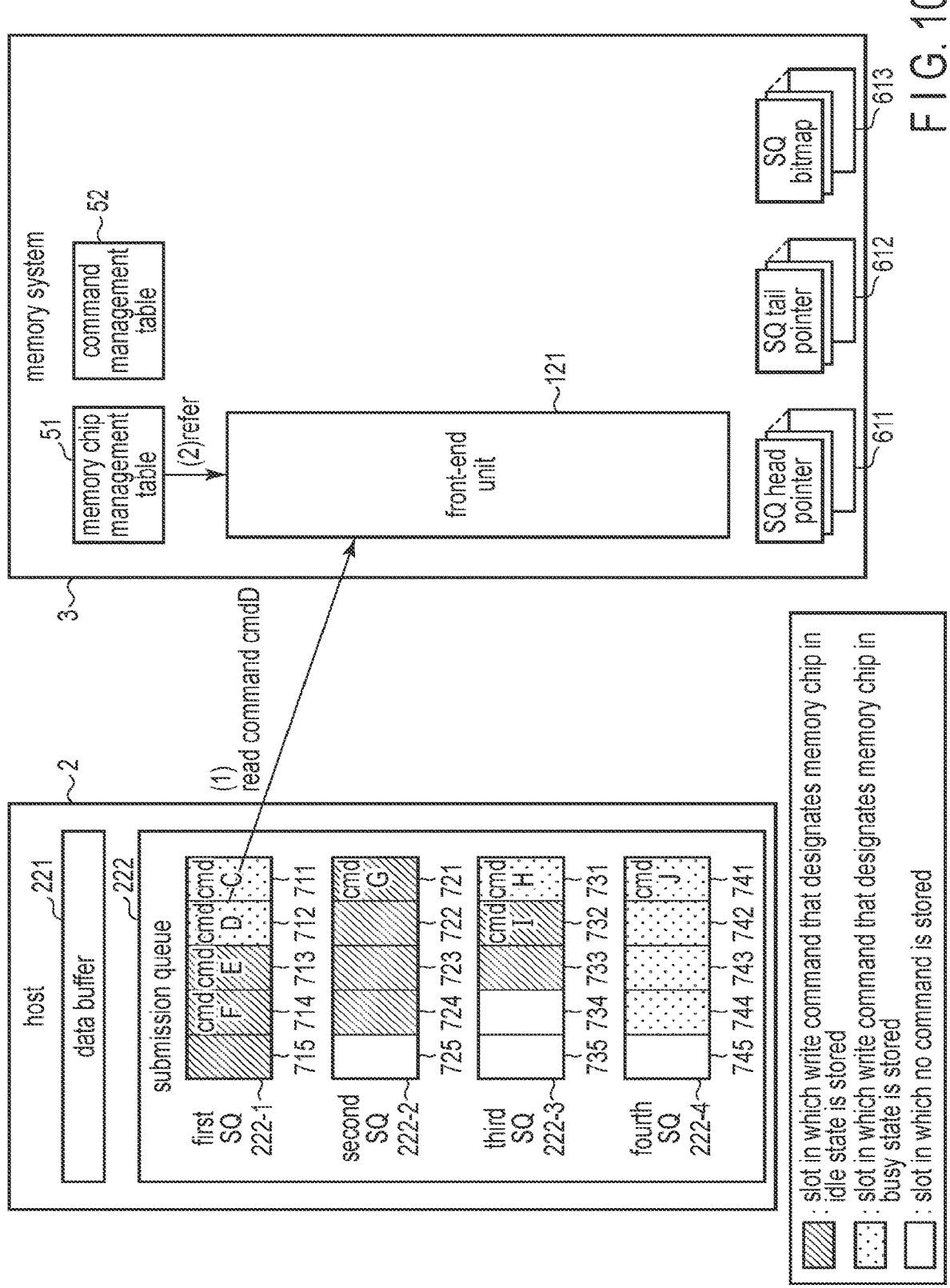
FIG. 10 is a diagram illustrating a second example of the fetch control operation in the memory system according to the first embodiment.

FIG. 10 illustrates an example of the fetch control operation following FIG. 9.

The front-end unit 121 reads the write command cmdD from the second slot 712 of the first submission queue 222-1 ((1) in FIG. 10). The front-end unit 121 determines that the nonvolatile memory chip 41 designated in the read write command cmdD (for example, the first nonvolatile memory chip 41-1) is in the busy state with reference to the memory chip management table 51 ((2) in FIG. 10). Thus, the front-end unit 121 does not fetch the write command cmdD. Specifically, for example, the front-end unit 121 discards data of the read write command cmdD and updates neither the SQ head pointer 611 nor the SQ bitmap 613.

Figure 11:
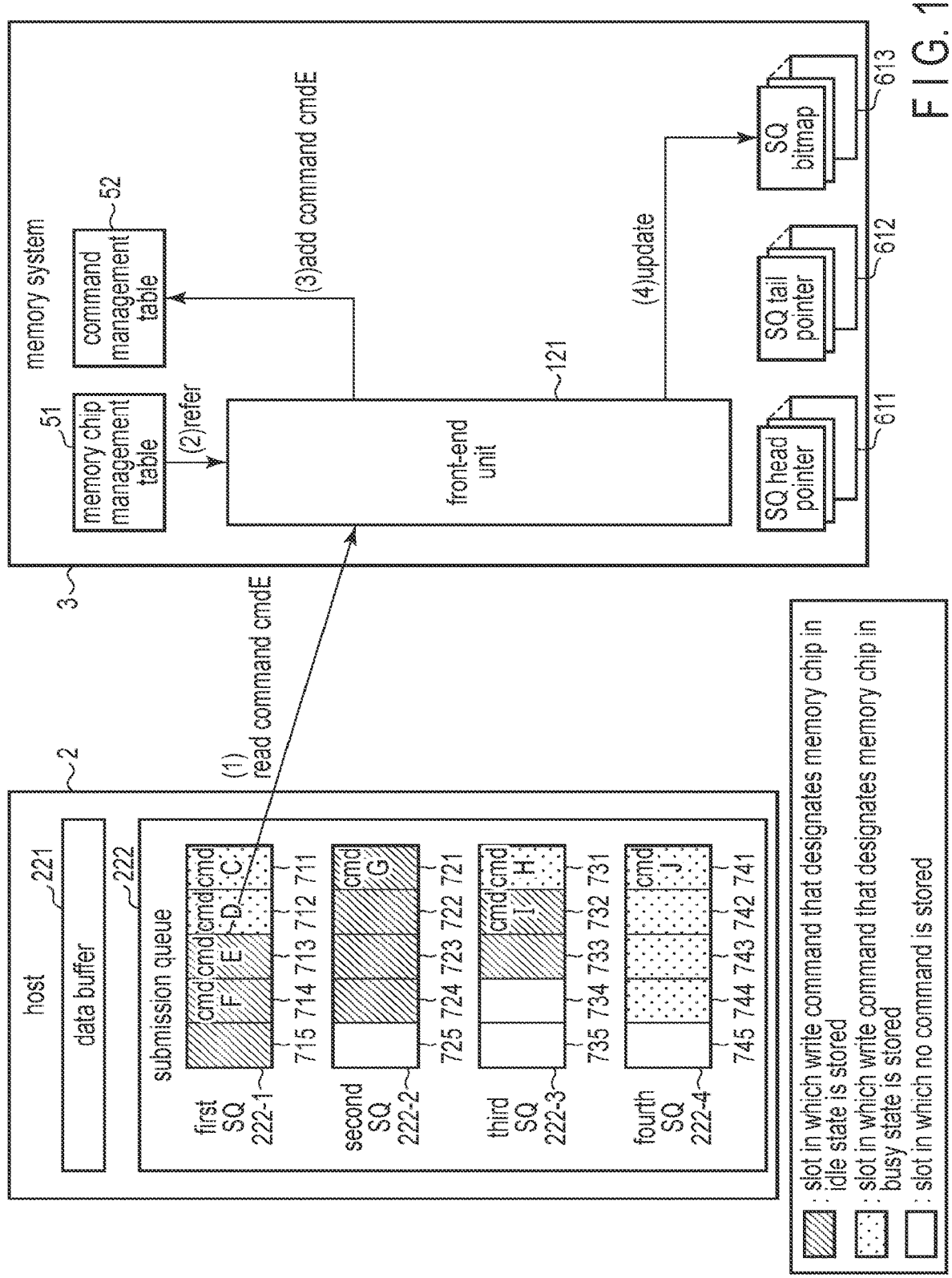
FIG. 11 is a diagram illustrating a third example of the fetch control operation in the memory system according to the first embodiment.

FIG. 11 illustrates an example of the fetch control operation following FIG. 10.

The front-end unit 121 reads the write command cmdE from the third slot 713 of the first submission queue 222-1 ((1) in FIG. 11). The front-end unit 121 determines that the nonvolatile memory chip 41 designated in the read write command cmdE (for example, the second nonvolatile memory chip 41-2) is in the idle state with reference to the memory chip management table 51 ((2) in FIG. 11). Thus, the front-end unit 121 fetches the read write command cmdE. Specifically, the front-end unit 121 adds the read write command cmdE to the command management table 52 ((3) in FIG. 11). Then, the front-end unit 121 updates the SQ bitmap 613 so as to indicate that the write command cmdE of the slot 713 has been fetched ((4) in FIG. 11). The updated SQ bitmap 613 corresponds to, for example, the SQ bitmap 613-2 of FIG. 8(b) indicating that the third write command has been fetched. The front-end unit 121 does not update the SQ head pointer 611 since the slot 713 is not the first slot of the first submission queue 222-1. In this manner, in the embodiment, a combination of reading a command from a submission queue 222 and adding the read command to the command management table 52 corresponds to fetching the command from the submission queue 222.

Figure 12:
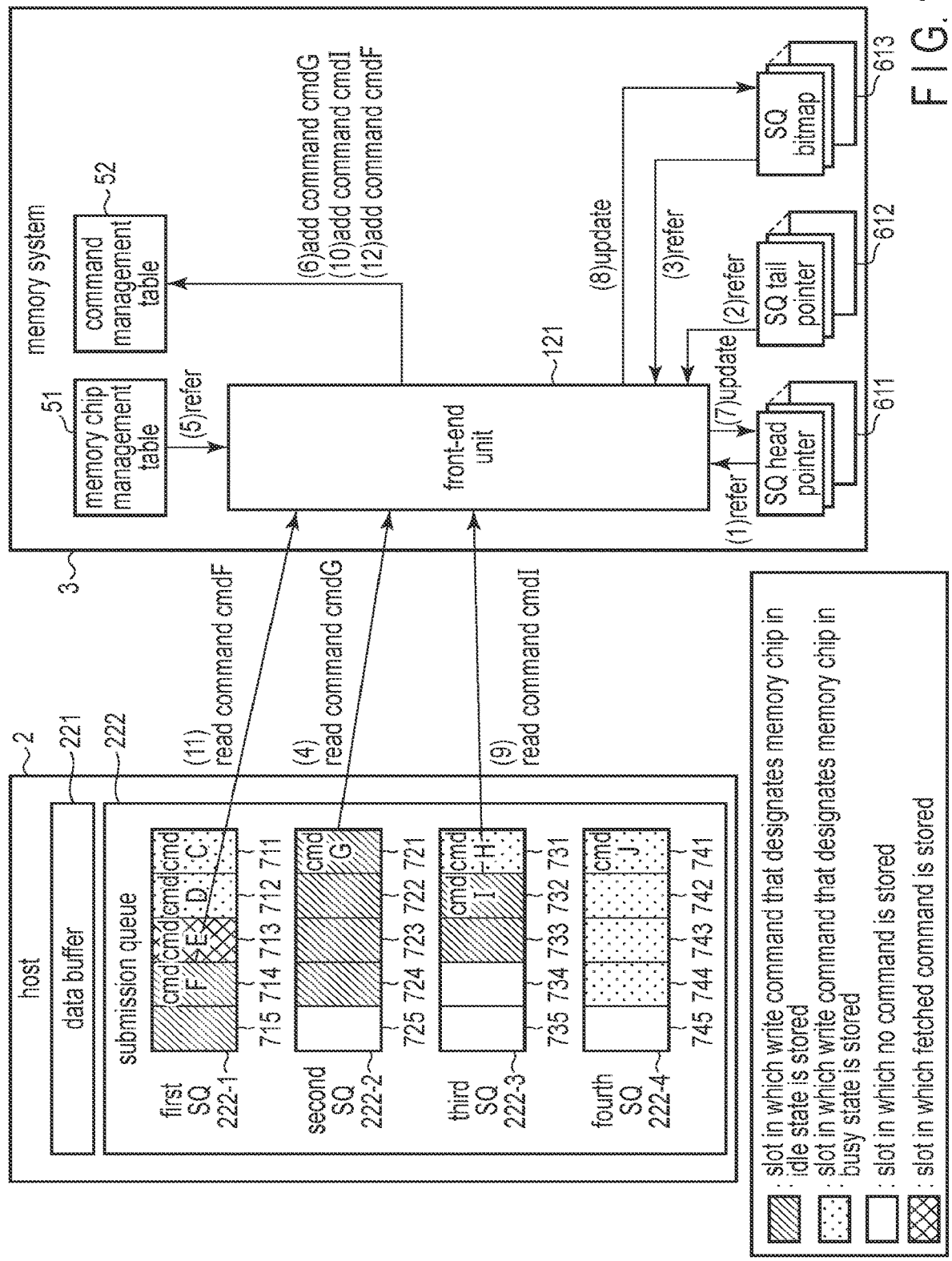
FIG. 12 is a diagram illustrating a fourth example of the fetch control operation in the memory system according to the first embodiment.

FIG. 12 illustrates an example of the fetch control operation following FIG. 11. After the write command cmdE is fetched from the slot 713 of the first submission queue 222-1, the second submission queue 222-2 is selected by arbitration as a new target submission queue 222 for fetch.

The front-end unit 121 determines that commands are stored in the second submission queue 222-2 with reference to the SQ head pointer 611 and the SQ tail pointer 612 that correspond to the second submission queue 222-2 ((1) and (2) in FIG. 12).

Subsequently, the front-end unit 121 refers to the SQ bitmap 613 that corresponds to the second submission queue 222-2 ((3) in FIG. 12). The SQ bitmap 613 that is referred to corresponds to, for example, the SQ bitmap 613-1 of FIG. 8(a) indicating that none of the write commands is fetched yet. The front-end unit 121 reads the write commands which are not fetched yet in order from the head of the second submission queue 222-2 on the basis of the SQ head pointer 611 and the SQ bitmap 613. Thus, the front-end unit 121 firstly reads the write command cmdG from the first slot 721 of the second submission queue 222-2 ((4) in FIG. 12).

The front-end unit 121 determines that the nonvolatile memory chip 41 designated in the read write command cmdG (for example, the third nonvolatile memory chip 41-3) is in the idle state with reference to the memory chip management table 51 ((5) in FIG. 12). Thus, the front-end unit 121 fetches the read write command cmdG. Specifically, the front-end unit 121 adds the read write command cmdG to the command management table 52 ((6) in FIG. 12). The front-end unit 121 updates the corresponding SQ head pointer 611 since the slot 721 is the first slot of the second submission queue 222-2 ((7) in FIG. 12). The front-end unit 121 updates the corresponding SQ bitmap 613 so as to indicate the fetch states of the write commands that are stored in the slots 722, 723, and 724 subsequent to the slot 721 ((8) in FIG. 12).

In the following description related to FIG. 12, this specification mainly explains write commands which are fetched and write commands which are not fetched, and omits explanations related to reference and update of the memory chip management table 51, the command management table 52, the SQ head pointer 611, the SQ tail pointer 612, and the SQ bitmap 613. An operation related to reference and update of the memory chip management table 51, the command management table 52, the SQ head pointer 611, the SQ tail pointer 612, and the SQ bitmap is similar to the operation performed when the write commands are fetched from the first submission queue 222-1 and the second submission queue 222-2 as described above.

After the write command cmdG of the slot 721 is fetched from the second submission queue 222-2, the third submission queue 222-3 is selected by arbitration as a new target submission queue 222 for fetch. In the third submission queue 222-3, the front-end unit 121 does not fetch the write command cmdH of the slot 731 and fetches the write command cmdI of the slot 732 ((9) and (10) in FIG. 12).

Further, after the write command cmdI of the slot 732 is fetched from the third submission queue 222-3, the fourth submission queue 222-4 is selected by arbitration as a new target submission queue 222 for fetch. All the four write commands that are stored in the respective slots 741, 742, 743, and 744 of the fourth submission queue 222-4 designate nonvolatile memory chips 41 in the busy state. Thus, the front-end unit 121 does not fetch any write command from the fourth submission queue 222-4. In other words, the fetch of commands from the fourth submission queue 222-4 is skipped.

Subsequently, for example, the first submission queue 222-1 is selected by the next arbitration as a new target submission queue 222 for fetch. In this case, the front-end unit 121 identifies a write command designating a nonvolatile memory chip 41 which is not in the busy state from one or more write commands excluding the fetched write command cmdE of the slot 713 on the basis of the SQ bitmap 613 corresponding to the first submission queue 222-1. Thus, among the four write commands that are respectively stored in the slots 711, 712, 714, and 715, the front-end unit 121 fetches neither the write command cmdC of the slot 711 nor the write command cmdD of the slot 712 and fetches the write command cmdF of the slot 714 ((11) and (12) in FIG. 12).

FIG. 13 illustrates an example of the command management table 52 to which write commands (more specifically, entries that correspond to the write commands) are added. Here, this specification describes an example in which the state of the command management table 52 illustrated in FIG. 4 is updated by the fetch control operation described above with reference to FIG. 9 to FIG. 12.

To the command management table 52 illustrated in FIG. 13, the write command cmdE, the write command cmdG, the write command cmdI, and the write command cmdF have been added. Both the write command cmdE and the write command cmdI designate the second nonvolatile memory chip 41-2 in the idle state. Both the write command cmdG and the write command cmdF designate the third nonvolatile memory chip 41-3 in the idle state.

In this manner, write commands for the nonvolatile memory chips 41 in the idle state are added to the command management table 52 by the fetch control operation. In other words, write commands for the nonvolatile memory chips 41 in the busy state are not added to the command management table 52.

Accordingly, write commands only for the nonvolatile memory chips 41 in the idle state can be fetched from the submission queues 222 by the fetch control operation performed by the front-end unit 121. By this configuration, it is possible to avoid a situation in which the resources of the memory system 3 are wasted because of a write command for which a corresponding process cannot be immediately started as the target nonvolatile memory chip 41 is in the busy state. Thus, regardless of the method by which the host 2 selects a nonvolatile memory chip 41 to be designated in a write command, the waste of the resources of the memory system 3 can be reduced, and a high throughput can be achieved with less resources.

Note that in an application in which a high priority is put on a latency of a response to a write command, the front-end unit 121 turns off the fetch control operation described above. In other words, the front-end unit 121 fetches write commands stored in each submission queue 222 in order regardless of whether or not the target nonvolatile memory chip 41 of each write command is in the busy state. The memory system 3 can be easily adopted for the application of putting a high priority on a latency by turning off the fetch control operation.

Figure 14:
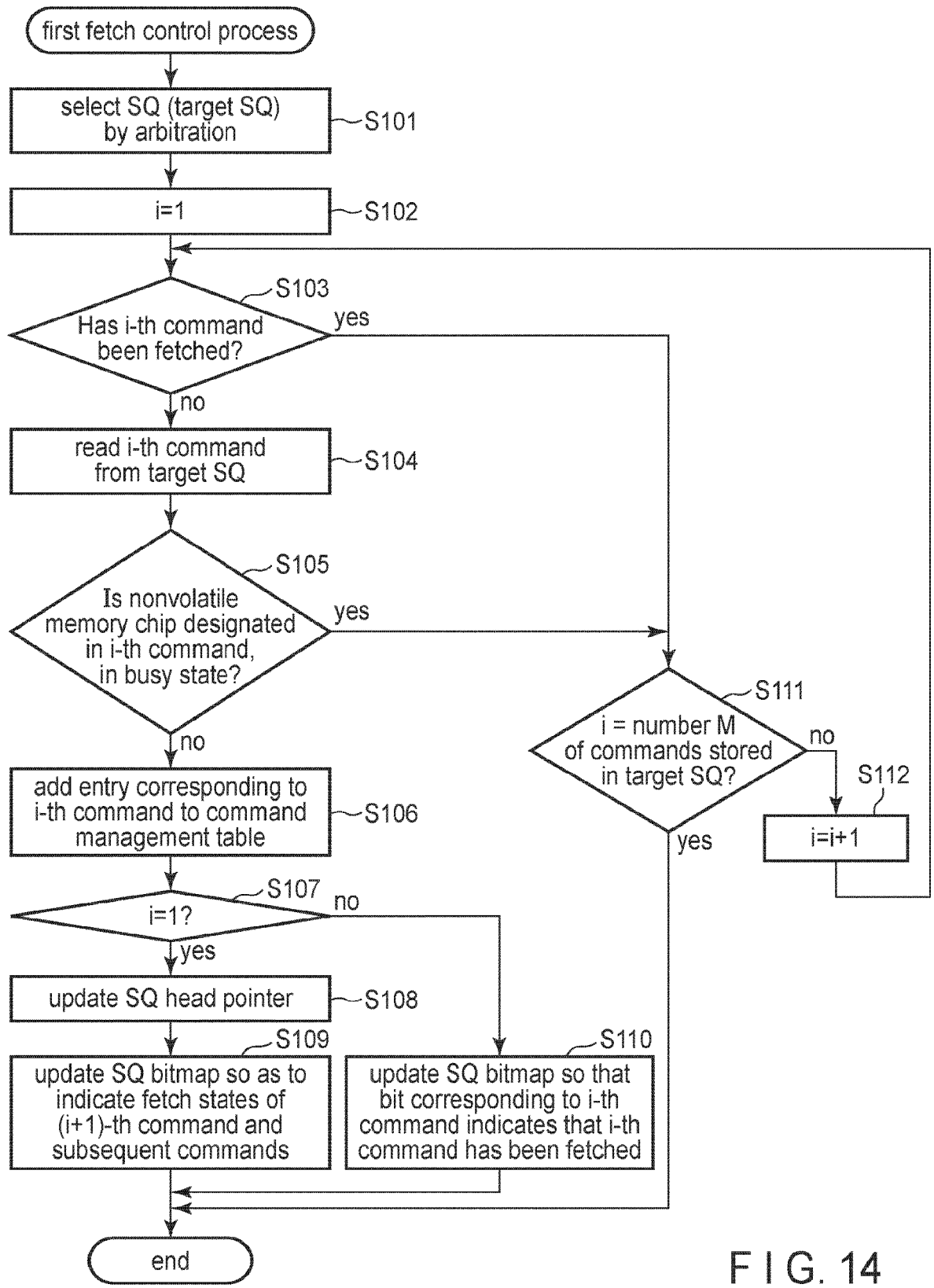
FIG. 14 is a flowchart illustrating an example of the procedure of a first fetch control process executed in the memory system according to the first embodiment.

FIG. 14 is a flowchart illustrating an example of the procedure of a first fetch control process performed by the front-end unit 121. The first fetch control process is a process for fetching a command for a nonvolatile memory chip 41 in the idle state from the submission queues 222 of the host 2. For example, the front-end unit 121 performs the first fetch control process at a time point when arbitration among the one or more submission queues 222 of the host 2 is to be performed. Here, it is assumed that one or more commands are stored in each of the one or more submission queues 222.

First, the front-end unit 121 selects a submission queue 222 from the one or more submission queues 222 by arbitration (step S101). The selected submission queue 222 is referred to as a target submission queue 222.

Subsequently, the front-end unit 121 sets a variable i to one (step S102). The variable i is used to identify, in the target submission queue 222, one of the one or more commands that are stored in the slots from a slot indicated by the SQ head pointer 611 (i.e., the first slot) to a slot one-slot before a slot indicated by the SQ tail pointer 612 (i.e., the end slot). The variable i indicates the order of a command stored in the target submission queue 222. The order of a command is an order of storing the command in the target submission queue 222, and a command stored in the first slot is the head and a command stored in the end slot is the last. In the following description, it is assumed that the number of commands stored in the target submission queue 222 is M. In this case, the variable i is set to any integer between one and M inclusive.

The front-end unit 121 determines whether or not the i-th command of the target submission queue 222 has already been fetched by using the SQ bitmap 613 corresponding to the target submission queue 222 (step S103).

When the i-th command of the target submission queue 222 is not fetched yet (no in step S103), the front-end unit 121 reads the i-th command from the target submission queue 222 (step S104). The front-end unit 121 determines whether or not the nonvolatile memory chip 41 designated in the read i-th command is in the busy state by using the memory chip management table 51 (step S105).

When the nonvolatile memory chip 41 designated in the i-th command is not in the busy state (no in step S105), the front-end unit 121 adds an entry corresponding to the i-th command to the command management table 52 (step S106). This process corresponds to fetching the i-th command from the target submission queue 222. Subsequently, the front-end unit 121 determines whether or not the variable i is one (step S107). That is, the front-end unit 121 determines whether or not the i-th command is the first command of the target submission queue 222.

When the variable i is one (yes in step S107), the front-end unit 121 updates the SQ head pointer 611 of the target submission queue 222 (step S108). Specifically, the front-end unit 121 adds one to the SQ head pointer 611 of the target submission queue 222. When the value obtained by adding one to the SQ head pointer 611 has reached the number of slots of the target submission queue 222, the front-end unit 121 sets the SQ head pointer 611 to zero. Then, the front-end unit 121 updates the SQ bitmap 613 of the target submission queue 222 so as to indicate fetch states of the (i+1)-th command and the subsequent commands (step S109) and ends the first fetch control process.

When the variable i is not one (no in step S107), the front-end unit 121 updates the SQ bitmap 613 of the target submission queue 222 so that the bit corresponding to the i-th command indicates that the i-th command has already been fetched (step S110) and ends the first fetch control process.

When the nonvolatile memory chip 41 designated in the i-th command is in the busy state (yes in step S105), the front-end unit 121 does not store an entry corresponding to the i-th command, in the command management table 52. This process means that the i-th command is not fetched from the target submission queue 222. Then, the front-end unit 121 determines whether or not the variable i is equal to the number M, which is the number of commands stored in the target submission queue 222 (step S111).

When the variable i is smaller than the number M (no in step S111), the front-end unit 121 adds one to the variable i (step S112). Then, the process executed by the front-end unit 121 returns to step S103. That is, the front-end unit 121 proceeds to a process for determining whether or not to fetch the next command in the target submission queue 222.

When the variable i is equal to the number M (yes in step S111), the front-end unit 121 ends the first fetch control process. This means that none of yet-to-be-commands in the target submission queue 222 is fetched since the designated nonvolatile memory chips 41 are in the busy state.

When the i-th command has already been fetched (yes in step S103), the process executed by the front-end unit 121 proceeds to step S111. The procedure of step S111 and the subsequent steps is as described above.

By the first fetch control process described above, the front-end unit 121 fetches a command for a nonvolatile memory chip 41 that is not in the busy state from the target submission queue 222 and does not fetch a command for a nonvolatile memory chip 41 that is in the busy state from the target submission queue 222. In the memory system 3, resources are consumed when a command has been fetched. Fetching commands only for the nonvolatile memory chips 41 which are not in the busy state enables the memory system 3 to avoid wasting the resources of the memory system 3 because of a command for which a corresponding process is not immediately started as the target nonvolatile memory chip 41 is in the busy state. Therefore, the throughput of processes can be improved in the memory system 3.

MODIFICATION EXAMPLE

A modification example of the fetch control operation will be explained with reference to FIG. 15 to FIG. 17.

FIG. 15 illustrates another example of commands fetched from the submission queues 222-1, 222-2, 222-3, and 222-4 by the fetch control operation. The write commands stored in each of the four submission queues 222-1, 222-2, 222-3, and 222-4 are as explained above with reference to FIG. 7.

A submission queue 222 from which a command is to be fetched is selected from the four submission queues 222-1, 222-2, 222-3, and 222-4 by arbitration. The front-end unit 121 of the modification example is configured to fetch the first write command of the selected submission queue 222 when the first write command designates a nonvolatile memory chip 41 in the idle state. The front-end unit 121 is further configured not to fetch the first write command of the selected submission queue 222 when the first write command designates a nonvolatile memory chip 41 in the busy state. That is, for the selected submission queue 222, the front-end unit 121 of the modification example determines whether or not to fetch the first write command and does not determine whether or not to fetch each of the subsequent write commands.

Specifically, when the first submission queue 222-1 has been selected by arbitration, the front-end unit 121 does not fetch any write command from the first submission queue 222-1. This is because the write command cmdC stored in the first slot 711 designates a nonvolatile memory chip 41 in the busy state (for example, the first nonvolatile memory chip 41-1).

When the second submission queue 222-2 has been selected by arbitration, the front-end unit 121 fetches the write command cmdG stored in the first slot 721. This is because the write command cmdG designates a nonvolatile memory chip 41 in the idle state (for example, the third nonvolatile memory chip 41-3).

When the third submission queue 222-3 has been selected by arbitration, the front-end unit 121 does not fetch any write command from the third submission queue 222-3. This is because the write command cmdH stored in the first slot 731 designates a nonvolatile memory chip 41 in the busy state (for example, the N-th nonvolatile memory chip 41-N).

When the fourth submission queue 222-4 has been selected by arbitration, the front-end unit 121 does not fetch any write command from the fourth submission queue 222-4. This is because the write command cmdJ stored in the first slot 741 designates a nonvolatile memory chip 41 in the busy state (for example, the first nonvolatile memory chip 41-1).

Now, a modification example of the fetch control operation is explained with reference to FIG. 16 and FIG. 17.

Figure 16:
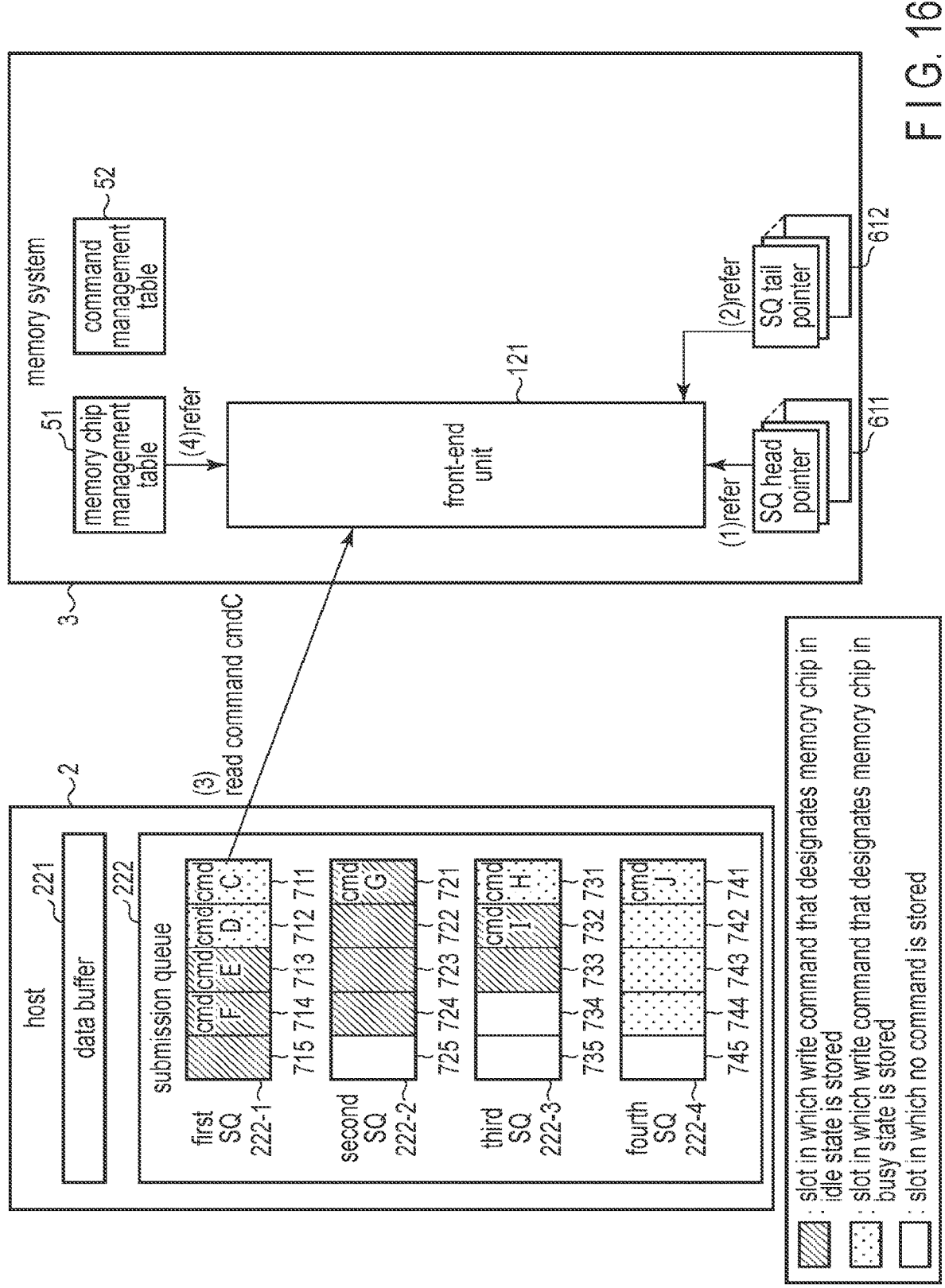
FIG. 16 is a diagram illustrating a fifth example of the fetch control operation in the memory system according to the first embodiment.

FIG. 16 illustrates an example of the fetch control operation. Here, the first submission queue 222-1 has been selected by arbitration as a target submission queue 222 for fetch.

The front-end unit 121 determines that commands are stored in the first submission queue 222-1 with reference to the SQ head pointer 611 and the SQ tail pointer 612 that correspond to the first submission queue 222-1 ((1) and (2) in FIG. 16).

Next, the front-end unit 121 reads the write command cmdC from the first slot 711 of the first submission queue 222-1 on the basis of the SQ head pointer 611 ((3) in FIG. 16). The front-end unit 121 determines that the nonvolatile memory chip 41 designated in the read write command cmdC is in the busy state with reference to the memory chip management table 51 ((4) in FIG. 16). Thus, the front-end unit 121 does not fetch the write command cmdC.

Specifically, for example, the front-end unit 121 discards data of the read write command cmdC and does not update the SQ head pointer 611. Then, the front-end unit 121 skips fetching a write command from the first submission queue 222-1.

Figure 17:
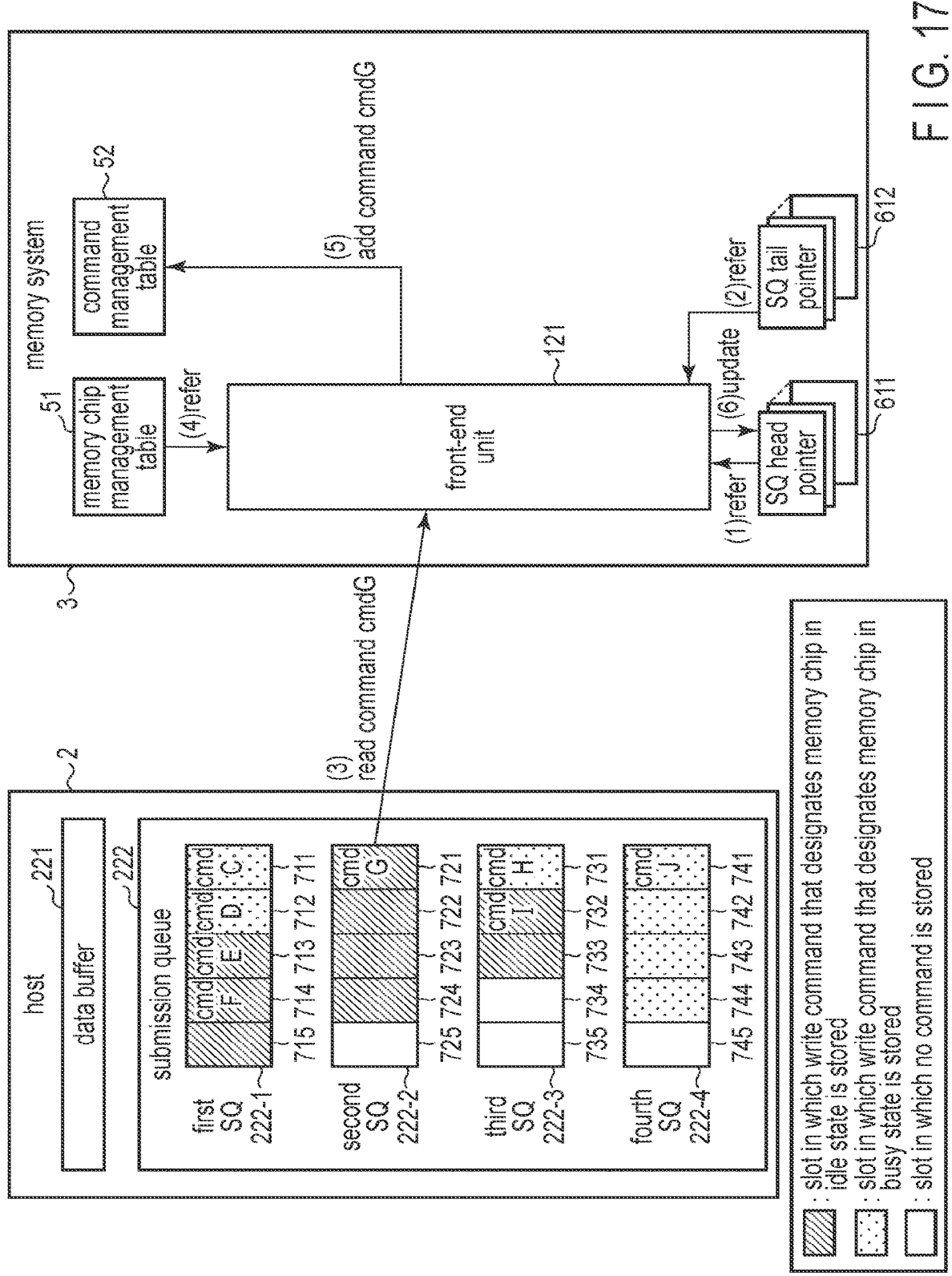
FIG. 17 is a diagram illustrating a sixth example of fetch control operation in the memory system according to the first embodiment.

FIG. 17 illustrates an example of the fetch control operation following FIG. 16. After fetching a write command from the first submission queue 222-1 is skipped, the second submission queue 222-2 is selected by arbitration as a new target submission queue 222 for fetch.

The front-end unit 121 determines that commands are stored in the second submission queue 222-2 with reference to the SQ head pointer 611 and the SQ tail pointer 612 that correspond to the second submission queue 222-2 ((1) and (2) in FIG. 17). Subsequently, the front-end unit 121 reads the write command cmdG from the first slot 721 of the second submission queue 222-2 on the basis of the SQ head pointer 611 ((3) in FIG. 17).

The front-end unit 121 determines that the nonvolatile memory chip 41 designated in the read write command cmdG (for example, the third nonvolatile memory chip 41-3) is in the idle state with reference to the memory chip management table 51 ((4) in FIG. 17). Accordingly, the front-end unit 121 fetches the write command cmdG. Specifically, the front-end unit 121 adds the read write command cmdG to the command management table 52 ((5) in FIG. 17). Then, the front-end unit 121 updates the corresponding SQ head pointer 611 ((6) in FIG. 17).

After the write command cmdG of the slot 721 is fetched from the second submission queue 222-2, the third submission queue 222-3 is selected by arbitration as a new target submission queue 222 for fetch. The front-end unit 121 does not fetch the write command cmdH stored in the first slot 731 of the third submission queue 222-3 in a manner similar to that in the case of the first submission queue 222-1. Then, the front-end unit 121 skips fetching a write command from the third submission queue 222-3.

Further, after fetching a write command from the third submission queue 222-3 is skipped, the fourth submission queue 222-4 is selected by arbitration as a new target submission queue 222 for fetch. The front-end unit 121 does not fetch the write command cmdJ stored in the first slot 741 of the fourth submission queue 222-4 in a manner similar to that in the case of the first submission queue 222-1. The front-end unit 121 skips fetching a write command from the fourth submission queue 222-4. Then, for example, the first submission queue 222-1 is selected by the next arbitration as a new target submission queue 222 for fetch.

FIG. 18 illustrates another example of the command management table 52 to which a write command is added. Here, this specification describes an example in which the command management table 52 in the state illustrated in FIG. 4 is updated by the fetch control operation described above with reference to FIG. 16 and FIG. 17.

To the management table 52 illustrated in FIG. 18, the write command cmdG has been added. The write command cmdG is a write command read from the first slot 721 of the second submission queue 222-2. The write command cmdG designates the third nonvolatile memory chip 41-3 in the idle state.

In this manner, a write command that is stored in the first slot of each submission queue 222 and designates a nonvolatile memory chip 41 in the idle state is added to the command management table 52 by the fetch control operation. A write command that designates a nonvolatile memory chip 41 in the busy state is not added to the command management table 52.

FIG. 19 is a flowchart illustrating an example of the procedure of a second fetch control process performed by the front-end unit 121. The second fetch control process is a process for fetching a command for a nonvolatile memory chip 41 in the idle state from the submission queues 222 of the host 2. For example, the front-end unit 121 performs the second fetch control process at a time point when arbitration among the one or more submission queues 222 of the host 2 is to be performed. Here, it is assumed that one or more commands are stored in each of the one or more submission queues 222.

First, the front-end unit 121 selects a submission queue 222 (target submission queue 222) from the one or more submission queues 222 by arbitration (step S21). The front-end unit 121 reads the first command from the target submission queue 222 (step S22). That is, the front-end unit 121 reads a command from a slot of the target submission queue 222 indicated by the SQ head pointer 611. Then, the front-end unit 121 determines whether or not the nonvolatile memory chip 41 designated in the read command is in the busy state by using the memory chip management table 51 (step S23).

When the nonvolatile memory chip 41 designated in the command is not in the busy state (no in step S23), the front-end unit 121 adds an entry corresponding to the command to the command management table 52 (step S24). This process corresponds to fetching the first command from the target submission queue 222. Subsequently, the front-end unit 121 updates the SQ head pointer 611 of the target submission queue 222 (step S25) and ends the second fetch control process.

When the nonvolatile memory chip 41 designated in the command is in the busy state (yes in step S23), the front-end unit 121 ends the second fetch control process without adding an entry corresponding to the command to the command management table 52. This process means that the first command is not fetched from the target submission queue 222.

By the second fetch control process described above, the front-end unit 121 fetches a command for a nonvolatile memory chip 41 that is not in the busy state and does not fetch a command for a nonvolatile memory chip 41 that is in the busy state. In the memory system 3, resources are consumed when a command has been fetched. Fetching commands only for the nonvolatile memory chips 41 that are not in the busy state enables the memory system 3 to avoid wasting the resources of the memory system 3 because of a command for which a corresponding process cannot be immediately started as the target nonvolatile memory chip 41 is in the busy state. Therefore, the throughput of processes can be improved in the memory system 3.

Note that the front-end unit 121 may perform the first fetch control process described above with reference to FIG. 14 when the first command is not fetched from any of the submission queues 222 in the host 2. In other words, when the first command of every submission queue 222 designates the nonvolatile memory chip 41 in the busy state, the front-end unit 121 may fetch one of the subsequent commands that designate the nonvolatile memory chip 41 which is not in the busy state from the target submission queue 222.

Second Embodiment

In the first embodiment, the front-end unit 121 of the memory system 3 is configured to fetch a command that designates a nonvolatile memory chip 41 in the idle state from the submission queues 222 and not to fetch a command that designates a nonvolatile memory chip 41 in the busy state from the submission queues 222. In a second embodiment, the back-end unit 122 of the memory system 3 is configured to start a process corresponding to a command that designates a nonvolatile memory chip 41 in the idle state and not to start a process corresponding to a command that designates a nonvolatile memory chip 41 in the busy state, among commands fetched from the submission queues 222.

A configuration of the memory system 3 according to the second embodiment is similar to that of the memory system 3 of the first embodiment. The second embodiment is different from the first embodiment in terms of operations performed by the front-end unit 121 and the back-end unit 122. Hereinafter, the difference from the first embodiment will be mainly described.

First, a fetch control operation performed by the front-end unit 121 will be explained.

Figure 20:
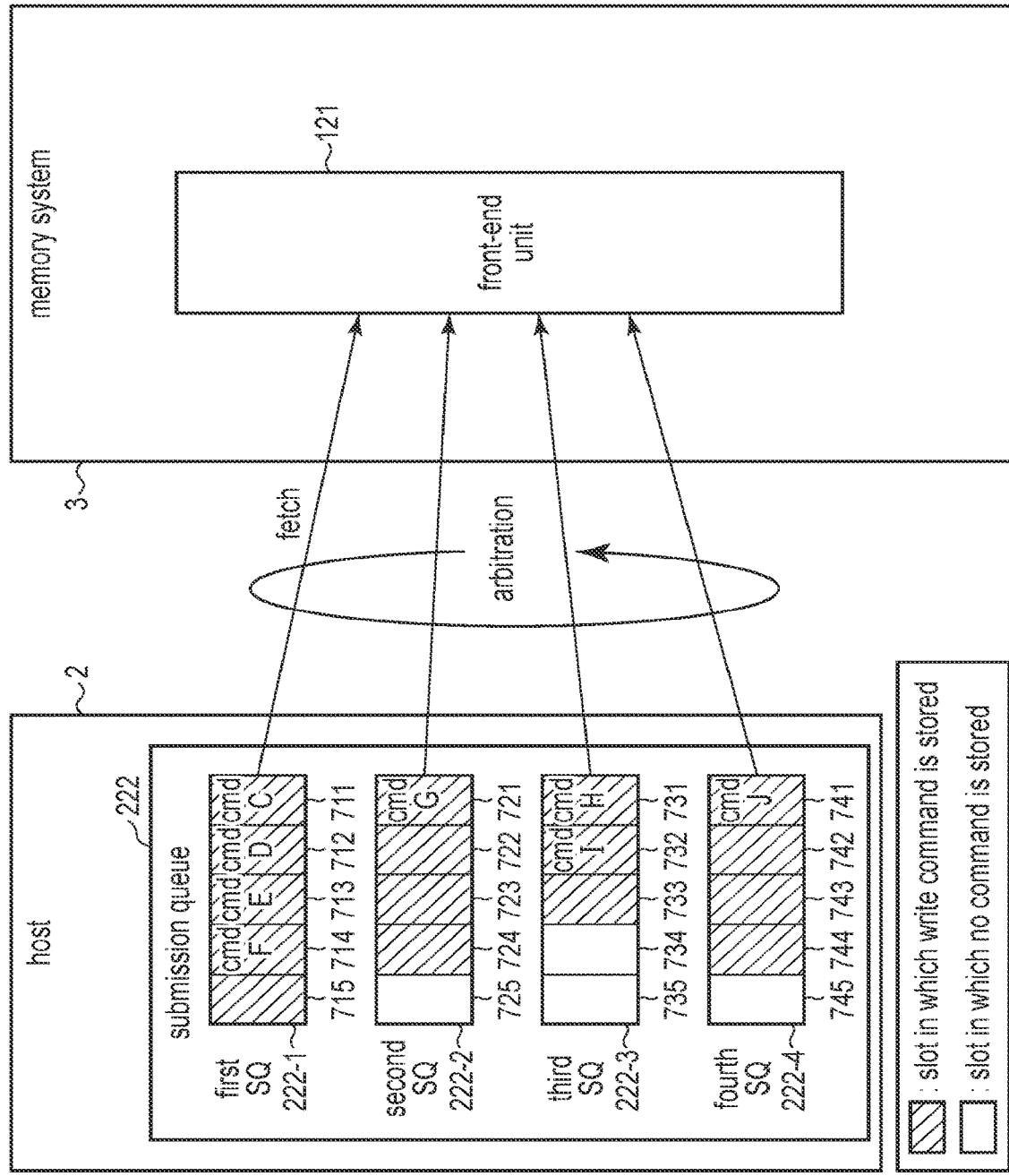
FIG. 20 is a diagram illustrating an example of commands fetched from submission queues by a fetch control operation in a memory system according to a second embodiment.

FIG. 20 illustrates an example of commands fetched from the submission queues 222-1, 222-2, 222-3, and 222-4 by the fetch control operation. The write commands stored in each of the submission queues 222-1, 222-2, 222-3, and 222-4 are as explained above with reference to FIG. 7.

The front-end unit 121 selects a submission queue 222 from which a command is to be fetched, from the four submission queues 222-1, 222-2, 222-3, and 222-4 by arbitration. The front-end unit 121 is configured to fetch the write commands in order from the head of the selected submission queue 222 without considering whether each write command stored in the submission queue 222 designates the nonvolatile memory chip 41 in the busy state or designates the nonvolatile memory chip 41 in the idle state.

Specifically, for example, when the first submission queue 222-1 has been selected by arbitration, the front-end unit 121 fetches the write command cmdC from the first slot 711. When the second submission queue 222-2 has been selected by arbitration, the front-end unit 121 fetches the write command cmdG from the first slot 721. When the third submission queue 222-3 has been selected by arbitration, the front-end unit 121 fetches the write command cmdH from the first slot 731. When the fourth submission queue 222-4 has been selected by arbitration, the front-end unit 121 fetches the write command cmdJ from the first slot 741.

Figure 21:
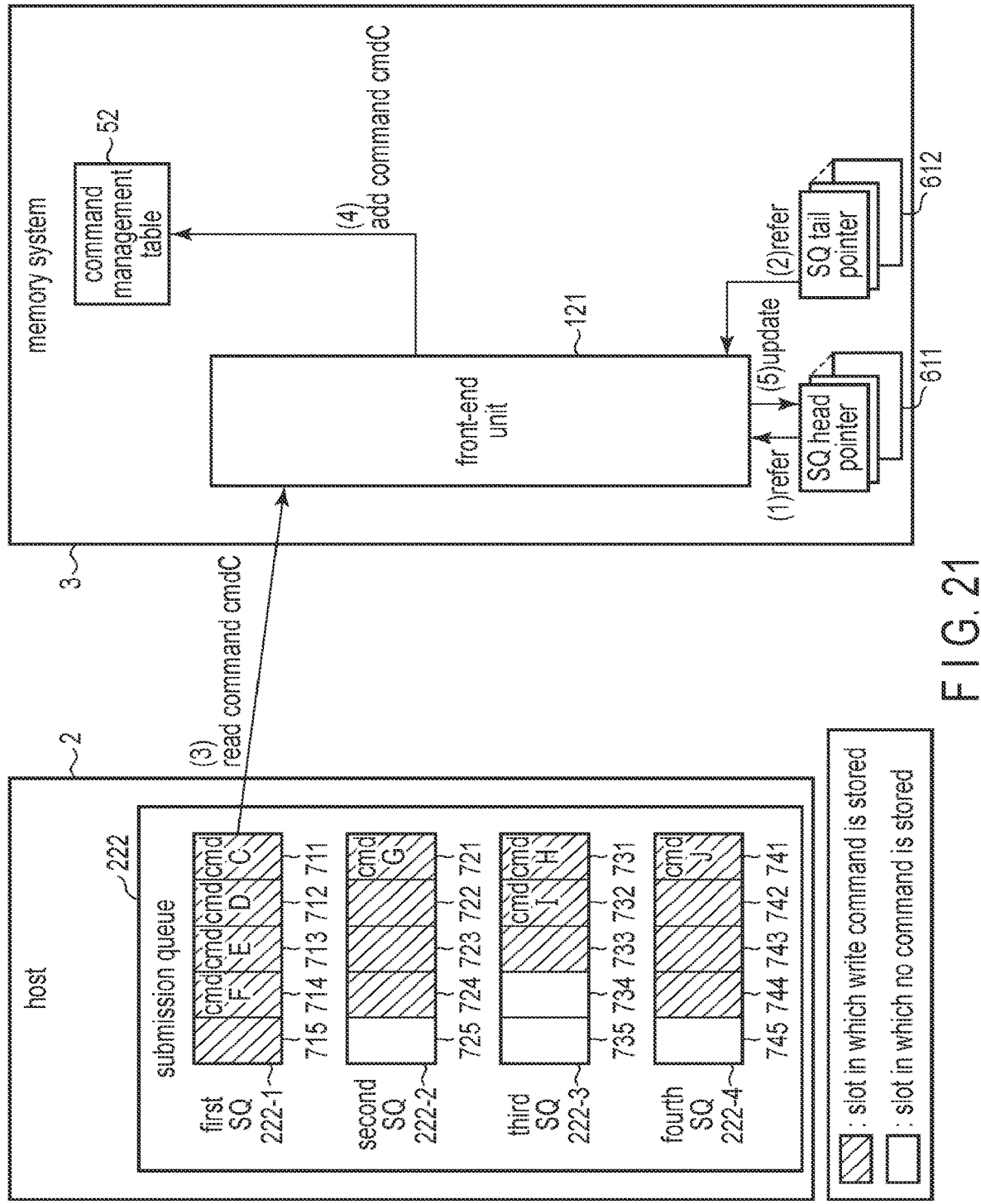
FIG. 21 is a diagram illustrating an example of the fetch control operation in the memory system according to the second embodiment.

FIG. 21 illustrates a specific example of the fetch control operation. Here, the first submission queue 222-1 is selected by arbitration as a target submission queue 222 for fetch.

The front-end unit 121 determines that commands are stored in the first submission queue 222-1 with reference to the SQ head pointer 611 and the SQ tail pointer 612 that correspond to the first submission queue 222-1 ((1) and (2) in FIG. 21).

Subsequently, the front-end unit 121 reads the write command cmdC from the first slot 711 of the first submission queue 222-1 on the basis of the SQ head pointer 611 ((3) in FIG. 21). The front-end unit 121 adds the read write command cmdC to the command management table 52 ((4) in FIG. 21). Then, the front-end unit 121 updates the corresponding SQ head pointer 611 ((5) in FIG. 21).

In this manner, the front-end unit 121 fetches the write command cmdC of the first slot 711 from the first submission queue 222-1.

After the write command cmdC is fetched from the first submission queue 222-1, the second submission queue 222-2 is selected by arbitration as a new target submission queue 222 for fetch. The front-end unit 121 fetches the write command cmdG from the first slot 721 of the second submission queue 222-2 by an operation similar to that in the case of the first submission queue 222-1.

After the write command cmdG is fetched from the second submission queue 222-2, the third submission queue 222-3 is selected by arbitration as a new target submission queue 222 for fetch. The front-end unit 121 fetches the write command cmdH from the first slot 731 of the third submission queue 222-3 by an operation similar to that in the case of the first submission queue 222-1.

After the write command cmdH is fetched from the third submission queue 222-3, the fourth submission queue 222-4 is selected by arbitration as a new target submission queue 222 for fetch. The front-end unit 121 fetches the write command cmdJ from the first slot 741 of the fourth submission queue 222-4 by an operation similar to that in the case of the first submission queue 222-1. Then, for example, the first submission queue 222-1 is selected by the next arbitration as a new target submission queue 222 for fetch.

FIG. 22 illustrates an example of the command management table 52 to which write commands are added. Here, this specification describes an example in which the state of the command management table 52 illustrated in FIG. 4 is updated by the fetch control operation described above with reference to FIG. 21.

To the command management table 52 illustrated in FIG. 22, the write command cmdC, the write command cmdG, the write command cmdH, and the write command cmdJ have been added. The write command cmdC and the write command cmdJ are write commands that designate the first nonvolatile memory chip 41-1 in the busy state. The write command cmdG is a write command that designates the third nonvolatile memory chip 41-3 in the idle state. The write command cmdH is a write command that designates the N-th nonvolatile memory chip 41-N in the busy state.

In this manner, the write commands are added to the command management table 52 by the fetch control operation. Each of the added write commands is the first command of each submission queue 222 that is selected by arbitration. Thus, the first command is fetched from each submission queue 222 selected by arbitration and is added to the command management table 52, regardless of whether the command designates the nonvolatile memory chip 41 in the busy state or in the idle state.

Next, a command execution operation and a busy state management operation performed by the front-end unit 121 and the back-end unit 122 will be explained.

FIG. 23 illustrates an example of the command execution operation and the busy state management operation performed by the front-end unit 121 and the back-end unit 122.

The command execution operation will be explained.

Here, it is assumed that the write command cmdC and the write command cmdG are managed in the command management table 52. Each of the write command cmdC and the write command cmdG is a write command for which a corresponding process is not started yet. User data to be written into the nonvolatile memory 4 in accordance with the write command cmdC is defined as user data 53C. User data to be written into the nonvolatile memory 4 in accordance with the write command cmdG is defined as user data 53G. The write command cmdC designates the first nonvolatile memory chip 41-1 in the busy state as a write destination of the user data 53C. The write command cmdG designates the third nonvolatile memory chip 41-3 in the idle state as a write destination of the user data 53G. Hereinafter, this specification explains execution of a process according to the write command cmdC and execution of a process according to the write command cmdG.

Execution of Process According to Write Command cmdC

The front-end unit 121 obtains command information of the write command cmdC (hereinafter, referred to as second command information) with reference to the command management table 52 ((1) in FIG. 23). The second command information includes, for example, information indicative of a memory location in the host 2 in which the user data 53C is stored, and the chip ID of the first nonvolatile memory chip 41-1 designated as the write destination of the user data 53C.

The front-end unit 121 determines that the first nonvolatile memory chip 41-1 indicated by the obtained second command information is in the busy state with reference to the memory chip management table 51 ((2) in FIG. 23). Accordingly, the front-end unit 121 does not start the process according to the write command cmdC. More specifically, the front-end unit 121 does not start transfer of the user data 53C corresponding to the write command cmdC from the host 2 to the memory system 3. That is, the front-end unit 121 and the back-end unit 122 suspend the execution of the process according to the write command cmdC until the first nonvolatile memory chip 41-1 is not in the busy state.

This configuration can prevent the write command cmdC for the first nonvolatile memory chip 41-1 in the busy state, that is, the write command cmdC for which a data write operation is not immediately started, from wasting the resources of the memory system 3.

(Execution of Process According to Write Command cmdG)

The front-end unit 121 obtains command information of the write command cmdG (hereinafter, referred to as third command information) with reference to the command management table 52 ((1) in FIG. 23). The third command information includes, for example, information indicative of a memory location in the host 2 in which the user data 53G is stored, and the chip ID of the third nonvolatile memory chip 41-3 designated as the write destination of the user data 53G.

The front-end unit 121 determines that the third nonvolatile memory chip 41-3 indicated by the obtained third command information is in the idle state with reference to the memory chip management table 51 ((2) in FIG. 23). In this case, the front-end unit 121 starts the process according to the write command cmdG. Specifically, the front-end unit 121 transfers the user data 53G from the data buffer 221 of the host 2 to the write buffer 53 of the memory system 3 on the basis of the third command information ((3) in FIG. 23). The front-end unit 121 may notify the back-end unit 122 of completion of the storage of the user data 53G in the write buffer 53.

Subsequently, the back-end unit 122 obtains the third command information with reference to the command management table 52 ((4) in FIG. 23). The back-end unit 122 performs a data-in operation for transferring the user data 53G stored in the write buffer 53 to the page buffer 32 of the third nonvolatile memory chip 41-3 on the basis of the obtained third command information ((5) in FIG. 23). Then, the back-end unit 122 instructs the third nonvolatile memory chip 41-3 to write the user data 53G stored in the page buffer 32 into the memory cell array 31 of the third nonvolatile memory chip 41-3 ((6) in FIG. 23). In accordance with this instruction, a program operation for writing the user data 53G into the memory cell array 31 is performed in the third nonvolatile memory chip 41-3 ((7) in FIG. 23).

By this configuration, the front-end unit 121 and the back-end unit 122 can perform the process according to the write command cmdG for the third nonvolatile memory chip 41-3 in the idle state.

Regarding the other write commands managed in the command management table 52, similarly, the front-end unit 121 and the back-end unit 122 can control execution of a process according to each write command depending on whether the designated nonvolatile memory chip 41 is in the busy state or in the idle state. Since the front-end unit 121 and the back-end unit 122 do not start a process according to each write command for the nonvolatile memory chip 41 in the busy state, it is possible to prevent each write command for which a data write operation is not immediately started from wasting the resources of the memory system 3. Therefore, the throughput of processes can be improved in the memory system 3.

Note that the busy state management operation illustrated as (8), (9), (10), and (11) in FIG. 23 is similar to the busy state management operation illustrated as (7), (8), (9), and (10) in FIG. 6.

FIG. 24 is a flowchart illustrating an example of the procedure of a third fetch control process executed by the front-end unit 121. The third fetch control process is a process for fetching a command from the submission queues 222 of the host 2. For example, the front-end unit 121 performs the third fetch control process at a time point when arbitration among the one or more submission queues 222 of the host 2 is to be performed. Here, it is assumed that one or more commands are stored in each of the one or more submission queues 222.

First, the front-end unit 121 selects a submission queue 222 (target submission queue 222) from the one or more submission queues 222 by arbitration (step S31). The front-end unit 121 fetches the first command from the target submission queue 222 (step S32). That is, the front-end unit 121 fetches a command from a slot of the target submission queue 222 indicated by the SQ head pointer 611. The front-end unit 121 adds an entry corresponding to the fetched command to the command management table 52 (step S33). Then, the front-end unit 121 updates the SQ head pointer 611 of the target submission queue 222 (step S34) and ends the third fetch control process.

By the third fetch control process described above, the front-end unit 121 fetches the first command from the target submission queue 222.

Figure 25:
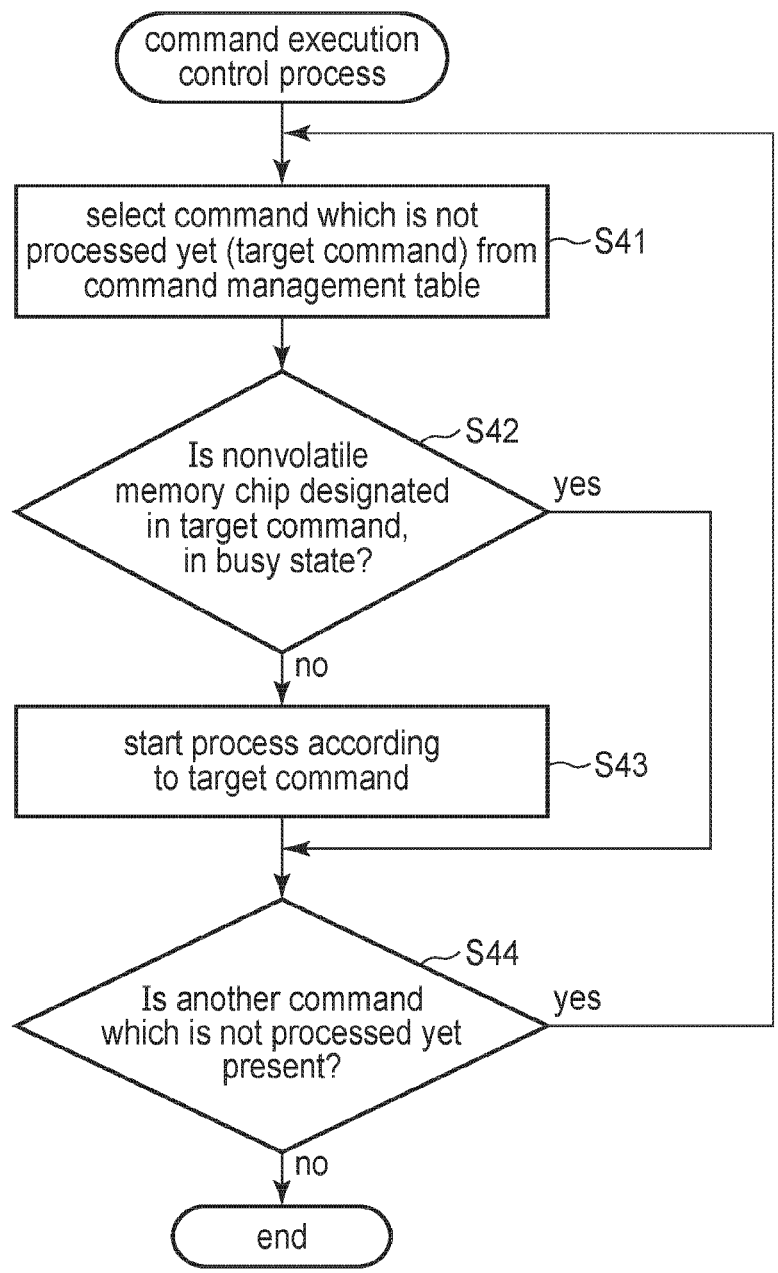
FIG. 25 is a flowchart illustrating an example of the procedure of a command execution control process executed in the memory system according to the second embodiment.

FIG. 25 is a flowchart illustrating an example of the procedure of a command execution control process executed by the back-end unit 122. The command execution control process is a process for controlling execution of a command which is managed in the command management table 52 and for which a corresponding process is not started yet (i.e., yet-to-be-processed command). The back-end unit 122 executes the command execution control process when the command management table 52 includes at least one entry.

First, the back-end unit 122 selects a command that is not processed yet from the command management table 52 (step S41). The selected command that is not processed yet is referred to as a target command. The back-end unit 122 determines whether or not the nonvolatile memory chip 41 designated in the target command is in the busy state (step S42).

When the nonvolatile memory chip 41 designated in the target command is not in the busy state (no in step S42), the back-end unit 122 starts a process according to the target command (step S43). The process according to the target command includes, for example, a process of transferring user data to be written into the nonvolatile memory chip 41 in accordance with the target command, which is a write command, from the data buffer 221 of the host 2 to the write buffer 53 of the memory system 3, and a process of writing the transferred user data into the nonvolatile memory chip 41.

On the other hand, when the nonvolatile memory chip 41 designated in the target command is in the busy state (yes in step S42), the back-end unit 122 does not start the process according to the target command.

Subsequently, the back-end unit 122 determines whether or not another command which is not processed yet is present in the command management table 52 (step S44).

When another command which is not processed yet is present in the command management table 52 (yes in step S44), the process performed by the back-end unit 122 returns to step S41. That is, the back-end unit 122 controls execution of a process according to said another command which is not processed yet.

When any command which is not processed yet is not present in the command management table 52 (no in step S44), the back-end unit 122 ends the command execution control process.

By the command execution control process described above, when a fetched command managed in the command management table 52 is a yet-to-be processed command for a nonvolatile memory chip 41 which is not in the busy state, the back-end unit 122 starts a process according to the command. When the fetched command managed in the command management table 52 is a yet-to-be-processed command for a nonvolatile memory chip 41 which is in the busy state, the back-end unit 122 does not start the process according to the command. By this configuration, it is possible to prevent a situation in which the resources of the memory system 3 are wasted because of a command for which a corresponding process cannot be immediately started as the target nonvolatile memory chip 41 is in the busy state. Therefore, the efficiency of processes can be improved in the memory system 3.

As explained above, according to the first and second embodiments, the efficiency of processes can be improved. The front-end unit 121 manages whether or not each of the plurality of nonvolatile memory chips 41 is in the busy state. When one or more requests (for example, one or more commands) issued by the host 2 are stored in at least one submission queue 222, the front-end unit 121 and the back-end unit 122 identify, from the one or more requests, a first request for the first nonvolatile memory chip 41-1 that is not in the busy state among the plurality of nonvolatile memory chips 41, and executes a process in accordance with the identified first request.

By this configuration, it is possible to avoid a situation in which the resources of the memory system 3 are wasted because of a request for which a corresponding process cannot be started as a target nonvolatile memory chip 41 is in the busy state. Therefore, regardless of the method by which the host 2 selects a nonvolatile memory chip 41 to be designated in each request, the waste of the resources of the memory system 3 can be reduced, and a high processing efficiency can be achieved with less resources.

Each of the various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to these embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a random access memory;
a plurality of nonvolatile memory chips, each of the plurality of nonvolatile memory chips including a page buffer and a memory cell array, the plurality of nonvolatile memory chips including at least a first nonvolatile memory chip and a second nonvolatile memory chip; and
a controller configured to:
determine, for each of the plurality of nonvolatile memory chips, whether or not data to be written next thereto is being stored in the random access memory;
determine, of the plurality of nonvolatile memory chips, a nonvolatile memory (A) in which data is being written from the page buffer to the memory cell array and (B) for which the random access memory is storing the data to be written next, as being in a busy state; and
when one or more requests issued by a host are stored in at least one queue of the host, each of the one or more requests designating one of the nonvolatile memory chips as a target on which a corresponding process is to be executed,
identify, from the one or more requests, a first request for the first nonvolatile memory chip that is not in the busy state,
execute a process in accordance with the identified first request,
fetch a second request from the queue, and
in response to determining that the second nonvolatile memory chip, which is a target of the second request, is in the busy state, suspend execution of a process in accordance with the fetched second request until the second nonvolatile memory chip becomes not in the busy state.

2. The memory system according to claim 1, wherein the controller is configured to execute, in response to the one or more requests from the host, processes in accordance with the requests for one of the plurality of nonvolatile memory chips designated in each of the one or more requests.

3. The memory system according to claim 1, wherein the controller is configured to:
in response to determining that the first nonvolatile memory chip, which is a target of the first request, is not in the busy state, fetch the first request from the queue.

4. The memory system according to claim 3, wherein the second request is stored in the queue before the first request is stored in the queue.

5. The memory system according to claim 4, wherein the controller is configured to manage information that indicates whether each of the one or more requests in the queue is fetched or not.

6. The memory system according to claim 5, wherein
the plurality of nonvolatile memory chips further includes a third nonvolatile memory chip,
a third request is stored in the queue after the first request is stored in the queue, and
the controller is configured to:
identify, from the one or more requests excluding the first request, the third request for the third nonvolatile memory chip that is not in the busy state by using the information; and
execute a process in accordance with the third request.

7. The memory system according to claim 1, wherein the controller is further configured to:
while suspending the execution of the process in accordance with the fetched second request,
fetch the first request from the queue; and
execute the process in accordance with the fetched first request.

8. The memory system according to claim 1, wherein the second request is stored in the queue before the first request is stored in the queue, and
the controller is configured to:
fetch the second request from the queue;
in response to determining that the second nonvolatile memory chip, which is the target of the second request, is in the busy state, suspend the execution of the process in accordance with the fetched second request until the second nonvolatile memory chip becomes not in the busy state;
fetch the first request from the queue; and
execute the process in accordance with the fetched first request.

9. The memory system according to claim 1, wherein
the at least one queue includes a first queue and a second queue,
the one or more requests include the first request stored in the first queue and the second request stored in the second queue, and
the controller is configured to:
fetch the first request from the first queue; and
execute the process in accordance with the fetched first request.

10. The memory system according to claim 1, wherein
the at least one queue is one of a plurality of queues, each of the plurality of queues includes a plurality of slots, and
the controller is configured to:
fetch a request from a head of the plurality of slots of each of the plurality of queues regardless of whether each of the plurality of nonvolatile memory chips is in the busy state or not.

11. The memory system according to claim 10, wherein
the plurality of queues include a first queue and a second queue,
and
the controller is configured to:
fetch the first request from the head of the first queue;
fetch the second request from the head of the second queue;
in response to determining that the first nonvolatile memory chip, which is a target of the first request, is not in the busy state, execute the process in accordance with the fetched first request; and
in response to determining that the second nonvolatile memory chip, which is the target of the second request, is in the busy state, suspend the execution of the process in accordance with the fetched second request.

12. The memory system according to claim 1, wherein each of the one or more requests is a write request designating one of the plurality of nonvolatile memory chips as a write destination.

13. A method of controlling a plurality of nonvolatile memory chips, each of the plurality of nonvolatile memory chips including a page buffer and a memory cell array, the plurality of nonvolatile memory chips including at least a first nonvolatile memory chip and a second nonvolatile memory chip, the method comprising:
   determining, for each of the plurality of nonvolatile memory chips, whether or not data to be written next thereto is being stored in a random access memory;
   determining, of the plurality of nonvolatile memory chips, a nonvolatile memory (A) in which data is being written from the page buffer to the memory cell array and (B) for which the random access memory is storing the data to be written next, as being in a busy state; and
   identifying, from the one or more requests that are issued by a host and are stored in at least one queue of the host, each of the one or more requests designating one of the nonvolatile memory chips as a target on which a corresponding process is to be executed, a first request for the first nonvolatile memory chip that is not in the busy state;
   executing a process in accordance with the identified first request;
   fetching a second request from the queue;
   determining that the second nonvolatile memory chip, which is a target of the second request, is in the busy state; and
   in response to determining that the second nonvolatile memory is in the busy state, suspending execution of a process in accordance with the fetched second request until the second nonvolatile memory chip becomes not in the busy state.

14. The method according to claim 13, further comprising:
   in response to determining that the first nonvolatile memory chip, which is a target of the first request, is not in the busy state, fetching the first request from the queue.

15. The method according to claim 14, further comprising:
   managing information that indicates whether each of the one or more requests in the queue is fetched or not.

16. The method according to claim 15, wherein the plurality of nonvolatile memory chips further includes a third nonvolatile memory chip,
   the second request is stored in the queue before the first request is stored in the queue, a third request is stored in the queue after the first request is stored in the queue, and
   the method further comprises:
      identifying, from the one or more requests excluding the first request, the third request for the third nonvolatile memory chip that is not in the busy state by using the information; and
      executing a process in accordance with the third request.

17. The method according to claim 13, wherein the at least one queue is one of a plurality of queues, each of the plurality of queues includes a plurality of slots, and
   the method further comprises:
      fetching a request from a head of the plurality of slots of each of the plurality of queues regardless of whether each of the plurality of nonvolatile memory chips is in the busy state or not.

18. The memory system according to claim 5, wherein the at least one queue of the host includes a plurality of slots, and
   the controller is further configured to:
      manage the information by using a bitmap that includes a plurality of bits, the number of the plurality of bits is equal to the number of the plurality of slots, each of the plurality of bits indicating whether or not a request has been fetched from a slot corresponding thereto; and
      in response to fetching the second request, update a bit of the bitmap that corresponds to a slot from which the second request has been fetched, to indicate that the second request has been fetched.

19. The method according to claim 15, wherein the at least one queue of the host includes a plurality of slots, and
   the method further comprises:
      managing the information by using a bitmap that includes a plurality of bits, the number of the plurality of bits is equal to the number of the plurality of slots, each of the plurality of bits indicating whether or not a request has been fetched from a slot corresponding thereto; and
      in response to fetching the second request, updating a bit of the bitmap that corresponds to a slot from which the second request has been fetched, to indicate that the second request has been fetched.

* * * * *